US005505987A

United States Patent [19]
Jennings et al.

[11] Patent Number: 5,505,987
[45] Date of Patent: Apr. 9, 1996

[54] PROCESSES FOR IMPROVING THE BOND BETWEEN HYDRATING CEMENT-BASED MATERIALS AND EXISTING CEMENT-BASED SUBSTRATES

[76] Inventors: Hamlin M. Jennings, 2728 Lincoln Wood Dr., Evanston, Ill. 60208; Anthony J. Kelzenberg, 1101 Holiday La., #12, DesPlaines, Ill. 60016; Simon K. Hodson, 320 Junipero Plz., Santa Barbara, Calif. 93105

[21] Appl. No.: 376,890

[22] Filed: Jan. 20, 1995

Related U.S. Application Data

[63] Continuation of Ser. No. 50,958, Apr. 21, 1993, abandoned, and a continuation-in-part of Ser. No. 418,027, Oct. 10, 1989, Pat. No. 5,232,496, Ser. No. 526,231, May 18, 1990, abandoned, and Ser. No. 418,027, said Ser. No. 50,958, is a division of Ser. No. 834,109, Feb. 10, 1992, abandoned.

[51] Int. Cl.$^6$ .............................. B05D 3/10; B05D 5/10; B05D 1/36; B32B 35/00
[52] U.S. Cl. ..................... 427/136; 427/140; 427/299; 427/309; 427/355; 427/403
[58] Field of Search ..................... 427/136, 140, 427/299, 301, 355, 403, 309, 427

[56] References Cited

U.S. PATENT DOCUMENTS

| | | |
|---|---|---|
| 299,571 | 6/1884 | Newton . |
| 358,288 | 2/1887 | Moore . |
| 423,796 | 3/1990 | Murdock . |
| 525,146 | 8/1894 | Haddock . |
| 1,421,888 | 7/1922 | Allen . |
| 1,589,598 | 6/1926 | Kessler . |
| 2,078,289 | 4/1937 | Sloan . |
| 2,277,203 | 3/1942 | Boult . |
| 2,315,732 | 4/1943 | Patch . |
| 2,432,971 | 12/1947 | Ruthman et al. . |
| 2,721,369 | 10/1955 | Burke . |
| 2,954,301 | 9/1960 | Szukiewicz . |
| 3,284,227 | 11/1966 | Gerton . |
| 3,439,450 | 4/1969 | Richards . |
| 3,468,993 | 9/1969 | Bierlich . |
| 3,526,172 | 9/1970 | Stuart . |
| 3,640,759 | 2/1972 | Primus et al. ........................ 427/239 |
| 3,683,760 | 8/1972 | Silva . |
| 3,687,021 | 8/1972 | Hensley . |
| 3,690,227 | 9/1972 | Welty . |
| 3,765,916 | 10/1973 | Berthier . |
| 3,853,417 | 12/1974 | Olsson . |
| 3,870,422 | 3/1975 | Medico, Jr. . |
| 4,069,063 | 1/1978 | Ball ............................ 106/97 |
| 4,072,786 | 2/1978 | Hinsche . |
| 4,177,232 | 12/1979 | Day ............................ 427/429 |
| 4,185,141 | 1/1980 | Krejce et al. . |
| 4,310,486 | 1/1982 | Cornwell et al. . |
| 4,349,398 | 9/1982 | Kearns et al. . |
| 4,427,610 | 1/1984 | Murray . |
| 4,533,393 | 8/1985 | Neuschaeffer et al. . |
| 4,608,795 | 9/1986 | Neuschaeffer et al. . |
| 4,609,573 | 9/1986 | Omata et al. . |
| 4,637,860 | 1/1987 | Harper et al. . |
| 4,640,715 | 2/1987 | Heitzmann et al. . |
| 4,642,137 | 2/1987 | Heitzmann et al. . |
| 4,721,659 | 1/1988 | Tieckelmann et al. .................. 427/403 |
| 4,732,781 | 3/1988 | Babcock et al. . |
| 4,842,649 | 6/1989 | Heitzmann et al. . |
| 4,851,259 | 7/1989 | Shimada et al. . |
| 4,859,504 | 8/1989 | Rossiter et al. ...................... 427/262 |
| 4,888,058 | 12/1989 | Rosenberg et al. . |
| 4,939,191 | 7/1990 | Kataoka et al. ...................... 524/5 |
| 4,944,595 | 7/1990 | Hodson . |
| 4,997,484 | 3/1991 | Gravitt et al. . |
| 5,049,411 | 9/1991 | Sellstrom et al. . |
| 5,049,412 | 9/1991 | Miller . |
| 5,108,790 | 4/1992 | Babcock . |
| 5,120,574 | 6/1992 | Cogliano et al. . |
| 5,232,496 | 8/1993 | Jennings et al. . |
| 5,269,845 | 12/1993 | Grunau et al. . |
| 5,286,425 | 2/1994 | Babcock et al. . |

FOREIGN PATENT DOCUMENTS

WO89/05284 6/1989 WIPO .

OTHER PUBLICATIONS

Andersen, *Effect of Organic Superplasticizing Admixtures and Their Components on Zeta Potential and Related Properties of Cement Materials*, The Pennsylvania State University (May 1987).

Alexander et al., *Aggregate–Cement Bond, Cement Paste Strength and the Strength of Concrete*, Journal of the American Concrete Institute, 59–81 (Aug. 1964).

Bensted, *Hydration of Portland Cement*, 324–331 (no date).

Bruere, *Importance of Mixing Sequence When Using Set–Retarding Agents With Portland Cement*, Nature, 32–33 (Jul. 6, 1963).

Bukowski et al., *Reactivity and Strength Development of $CO_2$ Activated Non–Hydraulic Calcium Silicates*, Cement and Concrete Research, vol. 9, 57–68 (1979) (no month available).

(List continued on next page.)

*Primary Examiner*—Diana Dudash

[57] ABSTRACT

Cement compositions and processes for improving the bond between new hydrating cement-based materials and the surface of "old" cement-based substrates are disclosed. A mechanically and chemically integral bond is created between the surfaces of the cement-based materials by moistening the old cement-based surface, exposing the moist surface to carbon or carbonate sources (such as with carbon dioxide) and then applying a new hydrating cement-based material thereon. The treatment of the surface of the cement-based substrate as described above creates an aqueous phase chemistry thereon which is compatible to the aqueous phase chemistry of the hydrating cement-based materials applied thereafter. The compatibility of the aqueous phase chemistries results in a mechanically and chemically integral bond formed between the surface of the old cement-based surface and the hydrating cement-based materials. The bond interface may be characterized by low calcium hydroxide concentrations, the presence of amorphous, noncrystalline material, a low water/cement ratio, greater than 90% of all voids being less than 0.15 mm. in diameter, and a low total air content of the interface. The present invention is particularly applicable to the repairing, resurfacing and topping of existing concrete highways, roads and surfaces.

60 Claims, 3 Drawing Sheets

OTHER PUBLICATIONS

Lea et al., *The Cement Aggregate Bond*, The Chemistry of Cement and Concrete, 265–266 (1971) (no month available).

Maycock et al., *Carbonation of Hydrated Calcium Silicates*, Cement and Concrete Research, vol. 4, 69–76 (1974) no month available.

Odler et al., *Early Hydration of Tricalcium Silicate*, Cement and Concrete Research, 277–283 (1979) (no month available).

Pistilli et al., *Properties and Possible Recycling of Solid Waste From Ready–Mix Concrete*, Cement and Concrete Research, 249–259 (1975) no month available.

Proceedings of the Fifth Mineral Waste Utilization Symposium, 8–15 (Apr. 13–14, 1976).

Singh et al., *Effect of Citric Acid on the Hydration of Portland Cement*, Cement and Concrete Research, vol. 16, 911–919 (1986) no month available.

Spigelman, *Limited Bibliography No. 376A*, Construction Technology Laboratories (Apr. 30, 1985).

Suzuki et al., *Formation and Carbonation of C–S–H In Water*, Cement and Concrete Research, vol. 15, 213–224 (1985).

Taylor et al., *Shear Bond Strength Between Coarse Aggregate and Cement Paste or Mortar*, Journal of the American Concrete Institute, 939–957 (Aug. 1964).

Unwalla, *Recycled Materials For Making Concrete*, The Indian Concrete Journal, vol. 53, 229 (Sep. 1979).

Bibliography File, *HRIS Selections Pertaining to: Use of Recycled Portland Cement Concrete as Aggregate* (May 1981).

*Guidelines for Bonded Concrete Overlay*, Technical Bulletin TB–007.0C(1990).

*Guidelines for Concrete Overlays of Existing Asphalt Pavements*, Technical Bulletin TB–009.OD, (1990).

*Guidelines for Unbonded Concrete Overlays, Technical Bulletin TB–005.OD(1990).*

| 1 | 2 | 3 | 4 | 5 | 6 | 7 | 8 |
|---|---|---|---|---|---|---|---|
| HEM CITIRC ACID PASTE + HEM CO2 MORTAR + CO2 GAS SURFACE TREATMENT | HEM PASTE + HEM MORTAR + CO2 GAS SURFACE TREATMENT | HEM MORTAR + CO2 GAS SURFACE TREATMENT | HEM CO2 MORTAR + CO2 GAS SURFACE TREATMENT | DRUM MORTAR + CO2 GAS SURFACE TREATMENT | HEM MORTAR | HEM PASTE DRUM MORTAR | GELLED HEM CITRIC ACID PASTE DRUM MORTAR |

FIG. 3

PROCESSES FOR IMPROVING THE BOND BETWEEN HYDRATING CEMENT-BASED MATERIALS AND EXISTING CEMENT-BASED SUBSTRATES

BACKGROUND

1. Related Application

This application is a continuation of U.S. application Ser. No. 08/050,958, filed Apr. 21, 1993, now abandoned, in the names of Hamlin M. Jennings, Ph.D., Anthony J. Kalzenberg, and Simon K. Hodson and entitled "COMPOSITIONS AND PROCESSES FOR IMPROVING THE BOND BETWEEN HYDRATING CEMENT-BASED MATERIALS AND EXISTING CEMENT-BASED SUBSTRATES," which is a divisional of U.S. application Ser. No. 07/834,109, filed Feb. 10, 1992, now abandoned, in the names of Hamlin M. Jennings, Ph.D.. Anthony J. Kalzenberg, and Simon K. Hodson and entitled "COMPOSITIONS AND PROCESSES FOR IMPROVING THE BOND BETWEEN HYDRATING CEMENT-BASED MATERIALS AND EXISTING CEMENT-BASED SUBSTRATES." This application is also a continuation-in-part of patent application Ser. No. 07/418,027, filed Oct. 10, 1989, now U.S. Pat. No. 5,232,496, in the names of Hamlin M. Jennings, Ph.D. and Simon K. Hodson and entitled "PROCESS FOR PRODUCING IMPROVED BUILDING MATERIAL AND PRODUCT THEREOF" and Ser. No. 07/526,231 filed on May 18, 1990, abandoned, in the names of Hamlin M. Jennings, Ph.D. and Simon K. Hodson, and entitled "HYDRAULICALLY BONDED CEMENT COMPOSITIONS AND THEIR METHODS OF MANUFACTURE AND USE," and Ser. No. 07/418,027 filed Oct. 10, 1989, in the names of Hamlin M. Jennings, Ph.D. and Simon K. Hodson, and entitled "PROCESS FOR PRODUCING IMPROVED BUILDING MATERIAL AND PRODUCT THEREOF." The foregoing applications are incorporated herein by specific reference.

2. The Field of the Invention

The present invention relates to hydraulic cement compositions and processing methods and techniques for hydraulic cement and concrete. More particularly, the present invention is directed to novel compositions and processes for improving the bond between new hydrating hydraulic cement-based materials and the existing (old) surfaces of cement-based (e.g., concrete) substrates. Hence, the present invention has specific application, for example, to the resurfacing and topping of existing concrete highways, roads, and surfaces of America's deteriorating infrastructures.

3. Technology Review

Hydraulic cements have been used for thousands of years as the agent in mortars (now typically referred to as "cement pastes") and concretes. These hydraulic cement-based materials are formed by mixing hydraulic cement with water and one or more aggregates, which are either simultaneously or subsequently blended into the mixture. When water is added to hydraulic cements, the existing minerals in the cement either decompose or combine with water, and a new phase (such as a calcium-silicate-hydrate structure) forms throughout the material. The water-cement mixture (i.e., cement paste or mortar) sets and then cures to bind the aggregates together to form concrete.

As used in the specification and claims, the term "cement paste" includes a fluid mixture of cement and water. Generally, in a cement paste, the hydration reaction has commenced, but it has not completed. Typical cement paste will have a water to cement ratio in the range from about 0.1 to about 5, with a preferred water to cement ratio in the range of from about 0.2 to about 1.0.

One of the most important uses of hydraulic cement compositions is in concrete. As used in the specification and claims, the term "concrete" is broadly defined as a hard, strong building material made by mixing a water-cement mixture with an aggregate (such as sand, gravel, other geologic materials, metals, and/or metallic alloys). The cement acts as a "glue" to bind the aggregate particles together in the concrete. The physical properties of concrete vary depending upon the cement composition, the choice of aggregates, and the processing techniques.

Concrete is commonly used to construct driveways, sidewalks, foundations, floors, roads, walls, supports, and other structures (hereinafter collectively referred to as "concrete surfaces"). Despite careful selection of cement and aggregates, virtually all concrete surfaces crack, chip, spall, or experience damage to one degree or another over time. Failures in concrete and damage to its surfaces may be assigned to one or more of three general causes: (a) unsuitable materials; (b) errors in preparation, placing, and curing; and (c) exposure to natural or artificial destructive agents (e.g., the weather or loads and stresses placed on the concrete surfaces).

Nowhere are the failures in concrete surfaces more apparent than with regard to the infrastructure of the United States. Although much of the country's infrastructure remains structurally sound, the serviceability of the infrastructure is reduced due to surface deterioration. From potholes in pavements to the cracking in the interstate highways to the severe spalling of bridges, the failure of all sound structures begins at the surface. Once a concrete surface is damaged, it is critical to repair it in order to reduce the severity and rate of future damage or deterioration. The techniques currently used—patching, filling, resurfacing with asphalt coatings, or new structural overlays with bonding agents—have proven to be either very temporary or very expensive.

In light of the foregoing, it has become apparent that our nation's infrastructure is in a state of disrepair that needs to be rectified. The cost to repair all of the country's incurred infrastructure damage is estimated to be as much as three trillion dollars ($3,000,000,000), if present technology is used.

Because of this prohibitive outlay, the U.S. government has set aside funds to explore new techniques or processes designed to make road and bridge repair easier and less expensive. Accordingly, pursuant to the Intermodal Surface Transportation Efficiency Act of 1991, 23 U.S.C. § 307, enacted on Dec. 18, 1991, the U.S. government has appropriated approximately fifteen million dollars ($15,000,000.) for research, along with up to sixty-three million dollars ($63,000,000) for road testing, of new technology pertaining to inorganically bonding new concrete to older, existing concrete surfaces.

Upon examination of damaged concrete surfaces, it is determined that the failure usually occurs at the interface or bond between the cement and the aggregate, suggesting that there was an inadequate bond, or cold joint, between the cement and the aggregate. Bond failures typically arise from mechanical causes (e.g., surface rigidity), physical surface forces, or in some cases chemical interaction which may be otherwise advantageous or disadvantageous. The ramification of such bond failures is that the properties of concrete are inferior to the properties of any of the concrete components.

Two main reasons exist for the failure of an integral bond to form between the two surfaces: (a) the shrinkage of newly cast hydraulic cement material as the water evaporates from the cement; and (b) the weak microstructure at the bond interface between the new and the old surfaces (believed to be due to the high water hydrate concentration in the "new" cement-base material or the high calcium hydroxide concentration in the "old" concrete material).

The formation of an inadequate bond or "cold joint" can also occur between two cement compositions set at different times because of a difference in phase chemistry between the two cement surfaces and the time of the joining of the cement-based materials. Cement blocks may be poured side-by-side (or on top of each other) at different times during the formation of monolithic structures, reconstruction of separated or damaged roads, the conditioning of a dam experiencing a fissure, or the construction or repair of many other concrete structures.

In large concrete structures, a concrete block cannot be poured in its entirety at the same time (due to a lack of continuous cement delivery or availability during construction) and subsequent additions of cement are made to complete the concrete block structure. Where the initial concrete block has begun to set and cure, the strength of the bond between the concrete block and the adjoining subsequent additions of cement or concrete is less than that of either the new cement (or concrete) or the "old" concrete block, thereby resulting in a cold joint.

Cement compositions may also be set at different times during the formation of layered concrete structures. Typically, pavements and concrete structures consist of more than one layer in order to bring the surface up to a appropriate final grade. A subsequent addition of cement on top of a set (or partially set) concrete layer is necessary in this process in order to level the concrete structure. The resulting laminate of the concrete structure is formed at different times and results in the creation of a cold joint between the adjacent layers that form the concrete structure.

Studies on the bond between the hydraulic cement compositions set at different times have been made by measurements of shearing or tensile strength, as determined by micro-hardness measurements across the interface and by microscopic examination of the interface. In almost all cases, the strength of the bond is less than that of the adjoining cement composition.

It has also been discovered that the bond strength, as a proportion of the strength of the body of the substrate of the set cement, appears to decrease as the water-cement ratio of the cement paste increases. A further factor known to affect bond strength in concrete is the aggregate-cement bond. With essentially all aggregates, since the bond between the cement and the aggregate is the weakest point of a concrete substrate, creating a better bond between the aggregates and the cement will result is concrete with better performance criteria.

Once a concrete surface is damaged, it is important to repair the damage in order to reduce the severity of future damage. (Repairing damaged concrete surfaces, as referred to in this specification and amended claims, implies restoring the damaged concrete surface to a state functionally equivalent to the undamaged state, approximately as strong as when the concrete was initially set.) While it is known in the art that damaged surfaces may be patched, filled, or resurfaced with thin or thick coatings, satisfactory long-term repair has not consistently been achieved.

There are many products on the market for repairing damaged concrete surfaces. Historically, concrete has been repaired by applying new concrete or mortar to the damaged area. This technique has not proven to be a successful long-term solution to the problem, because new concrete or mortar does not typically form an integral and strong bond between the two surfaces. (The term "integral" as used in this specification and the following claims means that the "integral" bond between the new cement paste and the "old" concrete surface is as substantially as strong as either of the adjacent component structures, i.e., the new hydraulic cement or other "old" concrete substrate.)

In recent years, latex, epoxy-type, or other organic materials have been used as additives to concrete. It was hoped that the latex cements with appropriate aggregates would solve the problems of traditional concrete repair compositions. Latex cements are fast setting and strong, but they are also very expensive, thereby making them impractical for large projects such as resurfacing interstate highways. Further, these latex cements unfortunately fail with age and with heavy use.

Other examples illustrating additional uses of hydraulic cement compositions demonstrate the need in the art for improved cement and concrete compositions. Nevertheless, from the foregoing, it will be appreciated that what is needed in the art are novel compositions and processes for improving the bond between hydrating cement-based materials and existing surfaces of cement-based surfaces and substrates, such that a new hydrating cement-based material may be placed adjacent or onto the surface of an existing substrate in order to form an integral and strong bond with the new hydrating cement-based material.

Additionally, it would be a significant advancement in the art to provide novel compositions and processes for improving the bond between hydrating cement-based materials and the existing surfaces of cement-based substrates such that the strength and physical characteristics of the resulting cement compositions or composites are enhanced.

It would be another significant advancement in the art to provide novel compositions and processes for improving the bond between hydrating cement-based materials and the existing surfaces of cement-based substrates such that the hydrating cement-based materials possess a high bonding strength to the surface of substrates without the use of latex, epoxies, or other organic additives.

It would be yet another significant advancement in the art to provide novel compositions and processes for improving the bond between hydrating cement-based materials and the existing surfaces of cement-based substrates such that the hydrating cement-based materials may be used for repairing defects such as spalls, cracks, or chips, in the surfaces of concrete surfaces like driveways, sidewalks, or road surfaces.

Also, it would be an advancement to provide novel compositions and processes for improving the bond between hydrating cement-based materials and the existing surfaces of cement-based substrates such that compositions set at different times, which are set as laminate, do not result in the formation of a cold joint therebetween.

It would be yet another significant advancement in the art to provide novel compositions and processes for improving the bond between hydrating cement-based materials and the existing surfaces of cement-based substrates such that the bond experiences improved strength and may be subject to greater stresses and pressures than previously known in the art.

It would be yet another advancement in the art to provide novel compositions and processes for improving the bond between hydrating cement-based materials and the existing surfaces of cement-based substrates such that new hydraulic cement compositions do not require special curing additives or techniques.

Further, it would be an advancement to provide novel compositions and processes for improving the bond between hydrating cement-based materials and the existing surfaces of cement-based substrates such that cement compositions set at different times, which are set side-by-side, do not result in the formation of a cold joint therebetween.

Still further, it would be an advancement in the art to provide novel compositions and processes for improving the bond between hydrating cement-based materials and the existing surfaces of cement-based substrates which will be effectively and economically useful for repairing America's infrastructure.

Such cement compositions and methods are disclosed and claimed herein.

BRIEF SUMMARY AND OBJECTS OF THE INVENTION

The present invention is directed to novel compositions and processes for improving the bond between hydrating cement-based materials and the existing surfaces of cement-based surfaces and substrates. More particularly, the present invention is directed to processes and compositions for obtaining a strong integral bond between existing cement-based substrates requiring repair (such as cement, mortar, or concrete) and new hydrating cement-based materials such cement-based substrates may include reinforcing materials such as steel, aggregate rock, and geological materials. Hence, the present invention is particularly applicable to the resurfacing and topping of existing concrete highways, roads, and surfaces of America's deteriorating infrastructures.

The present invention teaches a process which affects the chemistry at the surface of the old concrete substrate so that it is compatible with fresh, hydrating ("new") cement or concrete. The result is that the two materials form a chemically integral bond between the interfacing surfaces of the new and the old materials.

Because this invention affects the chemistry at the interface of the two materials, the process can be used in a variety of ways. It is believed that the process can be used as a paint-like protective coating on structures, as a thin-bonded overlay, as a concrete repair kit, as an economical resurfacing material for extremely large surfaces such as interstate highways, as a glue between the existing surfaces of two concrete structures, or to eliminate cold-joints in monolithic applications.

According to the present invention, the aqueous phase chemistry at a surface of the old cement-based substrate can be made compatible with the new cement material by exposure to a carbon dioxide or carbonate source. The bonding layer which is formed is characterized by the presence of an amorphous noncrystalline material in which the bond strength between the cement-based substrate surface and the new hydrating cement-based material is significantly improved. In fact, in many applications, the bond interface will be stronger than either of the adjacent materials.

Preferably, it has been found that with proper application of a carbon dioxide or carbonate source (such as carbon dioxide, carbon monoxide, sodium bicarbonate, sodium carbonate, or other materials capable of generating such activating carbon dioxide or carbonate) to the surface of a cement-based substrate, hydrating cement-based materials can mechanically, chemically, and integrally bond to the surface of the cement-based substrate. The bond formed therefrom is not comprised of bonding agents previously known in the art (typically, noncementitious organic additives to the new hydrating cement paste).

Furthermore, the bond is structurally sound. The bond which is formed is as strong as, if not stronger than, bonds formed using prior art bonding agents. In fact, it has been found that the bond is often stronger than either of the materials bonded together. Thus, a structurally sound bond is formed between a hydrating cement-based material and a surface of existing cement-based substrate without the substantial cost and/or procedures represented by the use of the prior art bonding agents.

It has also been found that an integral bond between hydrating cement-based materials and the surfaces of cement-based substrates can be created by moistening the surface of the existing substrate, which in one embodiment of the present invention may form a saturated surface wet ("SSW") condition, exposing the surface of the moist surface of the substrate to the previously mentioned carbon dioxide or carbonate sources, and then applying the hydrating cement-based materials on the existing surfaces of the cement-based substrates.

Alternatively, it has been found that an integral bond between hydrating cement-based materials and the surfaces of substrates can be created by moistening the surfaces of the substrates with a solution containing a carbon dioxide or carbonate source, and then applying the hydrating cement-based materials to the moistened surfaces of the substrates.

In each of the foregoing embodiments, the application of a hydrating cement-based material to the surface of a substrate includes the application of a cement paste, a hydrating concrete mass, or a plurality of alternating cement paste and concrete mass layers.

Preferably, a layer of cement paste and a subsequent layer of a hydrating concrete mass is placed onto the surface of a substrate exposed to the carbon dioxide or carbonate source.

Most preferably, a layer of high energy mixed cement paste is placed between the hydrating cement or concrete layer and the surface of the old substrate previously exposed to a carbon dioxide or carbonate source. (High energy mixed cement paste is prepared in a specialized mixer which imparts excellent properties of the cement paste. Such specialized high energy mixers are discussed in greater detail below and are available from Concrete Technology Corporation or E. Khashoggi Industries, both located in Santa Barbara, Calif.)

In another embodiment of the present invention, the application of a hydrating cement-based material to the surface of a substrate comprises the application of a hydrating cement-based material that includes a predetermined amount of microsilica to the surface of a substrate. Preferably, an amount of microsilica in the range from about 0.2 to about 0.3 (based as a percentage of microsilica to cement) is included in the hydrating cement-based material.

The integral bond may be formed between a damaged surface of a cement-based substrate and a repairing hydrating cement-based material or as a glue between the surfaces of two existing substrates.

As indicated above, the present invention can be use to form an integral bond between hydrating cement-based materials and the existing surfaces of cement-based substrates such that a new hydrating cement-based material may be placed onto or receive an existing surface of a substrate with an integral bond formed therebetween. This alternative procedure of the present invention is important to point out because the use of an integral bond is required in situations (such as new construction projects involving large concrete blocks) other than when a surface of a cement-based substrate is damaged.

The bond interface formed between the surface of the cement-based substrate and the hydrating cement-based materials of the present invention can be characterized by the presence of an amorphous noncrystalline microstructure, low void fractions, low calcium hydroxide concentrations, and the lack of latex, epoxies, or other organic additives. The bond interface resulting from the present invention is also characterized by having a mechanical and chemical integrity equal to, or greater than, the substrate when subjected to stresses.

The application of the present invention to the repair, rehabilitation, renovation, and reconstruction of our Nation's infrastructure is very significant. By overlaying or topping the old structure with a higher strength, higher durability, thin section, the ultimate service life can be extended much beyond original design and cost specification. A structurally sound "twenty-year" road can be given an additional fifty-year life or more with a minimal cost of repair. Because the overlay section can be made very dense, very strong, and as thin as economically feasible, it becomes the lowest cost means of repair or of service life enhancement.

It is, therefore, an object of the present invention to provide novel compositions and processes for improving the bond between hydrating cement-based materials and the existing surfaces of cement-based substrates such that a hydrating cement-based material may be placed onto or receive an existing surface of a cement-based substrate with a strong bond formed therebetween.

Another important object of the present invention is to provide novel compositions and processes for improving the bond between hydrating cement-based materials and the existing surfaces of cement-based substrates such that the strength and physical characteristics of the new cement compositions are enhanced.

Yet another important object of the present invention is to provide novel compositions and processes for improving the bond between hydrating cement-based materials and the existing surfaces of cement-based substrates such that the new cement compositions possess a high bonding strength to the existing surfaces of cement-based substrates without the use of latex epoxies, or other additives.

It is another important object of the present invention to provide novel compositions and processes for improving the bond between hydrating cement-based materials and the existing surfaces of cement-based substrates such that the new cement compositions may be used for repairing defects such as spall, cracks, or chips, in the surfaces of concrete, like driveways, sidewalks, or road surfaces.

Also, an important object of the present invention is to provide novel compositions and processes for improving the bond between hydrating cement-based materials and the existing surfaces of cement-based substrates such that the new cement compositions set at different times, which are set as a laminate, do not result in the formation of a cold joint therebetween.

It is yet another important object of the present invention to provide novel compositions and processes for improving the bond between hydrating cement-based materials and the existing surfaces of cement-based substrates such that the new cement compositions set at different times, which are set side-by-side, do not result in the formation of a cold joint therebetween.

It is a further important object of the present invention to provide novel compositions and processes for improving the bond between hydrating cement-based materials and the existing surfaces of cement-based substrates such that the bond experiences improved strength and may be subject to greater stresses and pressures than previously known in the art.

It is a further important object of the present invention to provide novel compositions and processes for improving the bond between hydrating cement-based materials and the existing surfaces of cement-based substrates such that the new cement compositions do not require special curing compositions or techniques that would inhibit their use for common construction projects.

It is a further important object of the present invention to provide novel compositions and processes for improving the bond between hydrating cement-based materials and the existing surfaces of cement-based substrates useful for construction, resurfacing, or repairing large construction projects such as interstate highways.

It is a further important object of the present invention to provide novel compositions and processes for improving the bond between hydrating cement-based materials and the existing surfaces of cement-based substrates which modify the aqueous chemistry of the concrete substrate to be compatible or substantially similar to that of the hydrating cement.

It is a further important object of the present invention to provide novel compositions and processes for improving the bond between hydrating cement-based materials and the existing surfaces of cement-based substrates which result in a bond that is amorphous, non crystalline material.

Still further, it is an important object of the present invention to provide novel compositions and processes for improving the bond between hydrating cement-based materials and the existing surfaces of cement-based substrates which result in a bond that is characterized by low calcium hydroxide concentrations.

These and other objects and features of the present invention will become more fully apparent from the following description and appended claims, or may be learned by the practice of the invention.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which:

FIG. 3 is a graph representing the results of the bond formed during the thin-bonded overlay tests conducted in Examples 5–10.

DETAILED DESCRIPTION OF THE PREFERRED EMBODIMENTS

Figure 1:
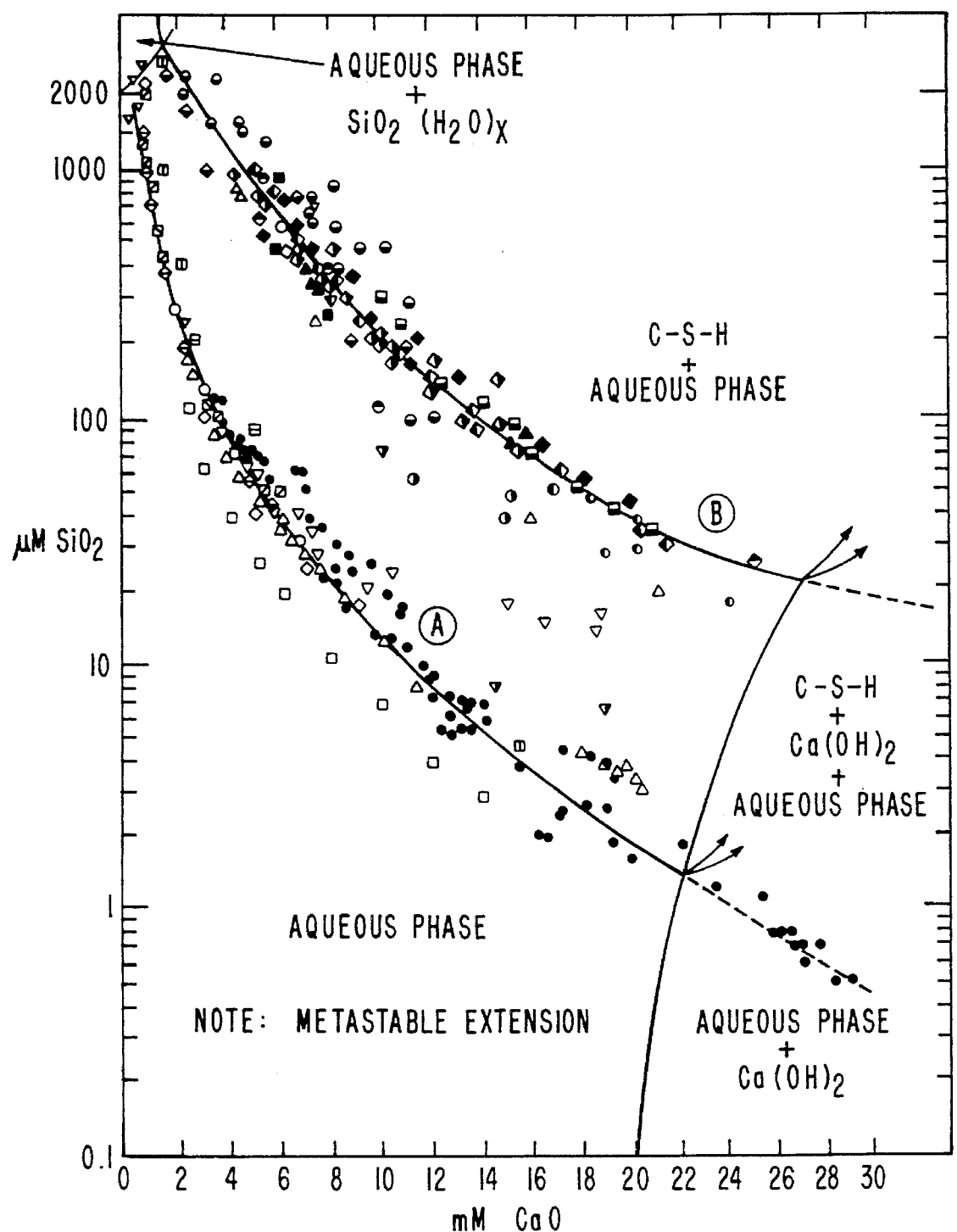
FIG. 1 is a phase diagram representing the aqueous phase chemistries of a water-rich region of a $CaO.SiO_2.H_2O$ system.

The present invention provides for improved cement compositions and processing techniques for manufacturing or repairing concrete structures with improved properties, such as strength and durability. More particularly, the present invention is directed to novel compositions and processes for improving the bond between new hydrating cement-based materials and the surface(s) of "old" cement-based substrates.

1. The Bonded Surfaces a. Hydrating Cement-Based Materials

Initially, the compositions and methods of the present invention involve the use of the family of cements known as hydraulic cements. A hydraulic cement is characterized by inorganic cements which form hydration reaction products with water. It is to be distinguished from other cements such as polymeric organic cements. The term "powdered hydraulic cement," as used in this specification and the appended claims, includes clinker, crushed, ground, and milled clinker in various stages of pulverizing and in various particle sizes.

Examples of typical hydraulic cements known in the art include: the broad family of portland cements (including ordinary portland cement without gypsum), calcium aluminate cements (including calcium aluminate cements without set regulators, e.g., gypsum), plasters, silicate cements (including $\beta$-dicalcium silicates, tricalcium silicates, and mixtures thereof), gypsum cements, phosphate cements, and magnesium oxychloride cements. The term "hydraulic cement" also includes other cements, such as $\alpha$-dicalcium silicate, which can be made hydraulic under hydrating conditions within the scope of the present invention.

Often, hydraulic cement compositions are formed by mixing powdered hydraulic cement and water: this is commonly referred to as "cement paste." Typically, hydraulic cement compositions are incorporated to form products by mixing the hydraulic cement and water, either simultaneously or subsequently, with some sort of aggregate blended into the mixture. As indicated previously, mortar and concrete are examples of hydraulic cement compositions formed by mixing hydraulic cement, water and some sort of aggregate.

The term "hydraulic cement compositions," as used herein, is broadly defined in terms of hydration. The preferred embodiment of the present invention practices hydraulic cement compositions as being cement-based materials which are in the hydration state any time prior to the initial set of the hydraulic cement paste composition.

The present invention may include other types of hydraulic cement compositions such as those discussed in copending patent application Ser. No. 07/526,231 filed on May 18, 1990, in the names of Hamlin M. Jennings, Ph.D. and Simon K. Hodson, and entitled "HYDRAULICALLY BONDED CEMENT COMPOSITIONS AND THEIR METHODS OF MANUFACTURE AND USE," wherein powdered hydraulic cement is placed in a near net position and compacted prior to the addition of water for hydration, which patent application is incorporated herein by specific reference.

Additional types of hydraulic cement compositions include those wherein carbon dioxide is mixed with hydraulic cement and water. This type of hydraulic cement composition is known for its structural integrity. This type of hydraulic cement composition is discussed in copending patent application Ser. No. 07/418,027 filed Oct. 10, 1989, in the names of Hamlin M. Jennings, Ph.D. and Simon K. Hodson, and entitled "PROCESS FOR PRODUCING IMPROVED BUILDING MATERIAL AND PRODUCT THEREOF," wherein water and hydraulic cement are mixed in the presence of a carbon source selected from the group consisting of carbon dioxide, carbon monoxide, carbonate salts, and mixtures thereof, which patent application is incorporated herein by specific reference.

b. Aggregates

It is within the scope of the present invention to include aggregates commonly used in the cement industry with powdered hydraulic cements, with no particular reference to the time of hydration. Examples of such aggregates include sand, gravel, rock, limestone, sandstone, pumice, perlite, vermiculite, calcium carbonate, and other geological materials. In addition to conventional aggregates used in the cement industry, a wide variety of other aggregates, including fillers, fibers, strengtheners, including metals and metal alloys (such as stainless steel, calcium aluminate, iron, copper, silver, and gold), balls, filings, pellets, powders (such as microsilica), and fibers (such as graphite, silica, alumina, fiberglass, polymeric, organic fibers, and such other fibers typically used to prepare various types of composites), may be combined with the hydraulic cements within the scope of the present invention.

It is also within the scope of the present invention to include set hydraulic cement compositions as examples of aggregates. Examples of hydraulic cement compositions include, but are not limited to, ground-up concrete, mortar, or cement. It will be readily appreciated that this provides a use for old concrete materials from obsolete structures, which are currently filling the limited landfill areas. Moreover, due to more restrictive environmental legislation, many ready-mix concrete suppliers are often obligated to find adequate means of handling, recycling, and marketing their waste solids. The present invention sets forth a use for such waste solids.

For many uses, it is preferable to include a plurality of differently sized and graded aggregates capable of filling interstices between the aggregates and the hydraulic cement so that greater density (and hence, greater strength) can be achieved. In such cases, the differently sized aggregates would typically have particle sizes in the range from as small as about 5 µm to as large as about 2 inches. (Of course, different purposes for the resulting concrete will dictate the preferred properties of the concrete and the appropriate size of aggregates to be used.) It is within the skill of one in the art to know generally which aggregates are to be used to achieve the desired characteristics in the final cement or concrete article or structure.

c. Existing Surfaces of Substrates

The present invention is directed to applying a hydrating cement-based material to the existing surface of some type of substrate, preferably some type of cement-based substrate. It is at the area where the hydrating cement-based material is applied to the surface of the cement-based substrate where a bond interface is formed. As it will be discussed in greater depth hereinafter, the cement-based substrates of the present invention can be characterized as those which may be treated to have an aqueous phase chemistry which can be made compatible with the aqueous phase chemistry of hydrating cement-based materials.

Although all types of hydraulic cement-based substrates and certain types of other substrate structures may be employed in the present invention, preferably, the present invention has particular application where concrete is the cement-based substrate. The present invention employs concrete which has set or cured, as the substrate. The word "old concrete" is a term commonly employed in the art to describe concrete that has been set and allowed to cure for a period of time.

Examples of old concrete include existing sidewalks or road surfaces, interstate highways, bridges, and similar structures. It also includes a portion of concrete structures that may have been poured and begun to set, and a cold joint is presented to a new hydrating cement-based material placed adjacent, or upon, the concrete structures. Such a cold joint will occur anytime after initial set, which typically occurs from about three to about four hours after manufacture. It will be appreciated that the most likely use of the present invention is where the cement-based substrate has cured, and may require repair due to the weathering experienced by the cement-based substrate.

While the surfaces of concrete will be discussed for explanation purposes, and is the preferred cement-based substrate, it will be appreciated that the scope of the invention is not limited as such. Relatedly, the cement-based substrates may be any type of cement or mortar composition, or in large blocks, or any of the aggregates previously discussed. Moreover, the term "substrate surfaces" as defined in this specification includes such surfaces as asphalt.

2. Formation of the Bond Between Bonding Surfaces

The present invention teaches a process to preferably make the aqueous phase chemistry of the surface of the old concrete compatible with fresh (i.e., hydrating) concrete, allowing the two materials to form a mechanically and chemically integral bond.

The process can be used in a variety of ways. The process can be used as a paint-like protective coating on structures, as a thin-bonded overlay, as a concrete repair kit, as an economical resurfacing material for extremely large surfaces such as interstate highways, as a glue between the existing surfaces of two concrete structures, or to eliminate cold-joints in monolithic applications.

According to one embodiment of the present invention, a hydrating cement-based material is applied to a surface of a cement-based substrate in the manner discussed in greater detail hereinafter. The application of the hydrating cement-based material to the surface of the cement-based substrate results in the formation of a bond interface therebetween. The characteristics of the bond formed therebetween is of a novel type that it is of interest to those responsible for improving the bonding between cement-based materials set at different times.

As pointed out, the present invention can be directed to concrete as the type of cement-based substrate. It can be appreciated that concrete is often damaged due to a variety of factors and requires the application of a filler which will attempt to repair the concrete to its original integrity and serviceability. Unfortunately, in such a repair, the surface of the filler has an incompatible aqueous phase chemistry with the aqueous phase chemistry of the surface of the old concrete. Consequently, no integral chemical composition, product, or bond is formed.

It will be appreciated that when mixing cement materials set at different times, the first set cement/second set cement bond is the weakest point of a cement composition. Thus, the present invention may be employed to bring a hard stable material, such as concrete (or almost any substrate, as defined above), in contact with another material which is still forming such that an integral cohesive and adhesive bond is formed therebetween that is not a weak point, or a point of discontinuity. It is such weak points or points of discontinuity which lead to failure when stress is applied to the final product.

Besides the foregoing, the present invention may be used as a glue to bond the surfaces of two existing substrates or the formation of a laminate.

The present invention may also be employed to improve the bond between "cold joints" (the interface between hydrating cement-based materials and the surfaces of cement-based substrates set at different times) which are present not as a defect, but as a natural occurrence during the process of construction. This type of use can be illustrated by discussing the formation of a roadway.

Preferably, a roadway, which is constructed of cement, is formed in its entirety as a block of cement. A shortage of cement, however, may occur before the block is formed in its entirety, or the roadway cannot be completed in one day because of its size, and the roadway must be comprised of two or more blocks of cement which set at different points of time. Because the blocks set at different points of time, a cold joint is formed between any such blocks.

In the past, the presence of cold joints required the use of epoxies, or other special additives, to form a bond between the cement surfaces of varying set ages. The present invention, however, may now be employed to create an integral bond between adjacent blocks of cement without the use of latex, epoxies, or other organic additives.

Often, highways or other substrate surfaces need to be graded or leveled; however, the substrate comprising the highway may have set or begun to set and the addition of further substrate to level off the substrate surface results in the formation of a cold joint between the two layers. The cold joint between the layers provides minimal or no mechanical integrity between the two surfaces.

It should also be mentioned that a cold joint is formed by the layering of a thin layer of a high quality substrate upon a low cost filler. This type of layering represents a substantial savings in cost to the formation of high quality structures if the mechanical instability of a cold joint resulting therebetween could be obviated. Use of the present invention provides for such a high quality substrate integrally bonded to a low cost filler such that a cold joint does not occur while allowing for superior wear and curability at the reduced cost.

The present invention can similarly be used to integrally bond a low quality surface upon a high quality substrate. Such a laminate allows for a sacrificial layer placed on the surface of a composition which can be a further savings in the cost of the formation of high quality structure. Such a laminate also allows one to place a coating upon the surface of a composition for aesthetically-pleasing reasons, should the coating not have been desired at the time the composition was formed. Thus, the present invention can be employed to improve the bond between two surfaces such that the new laminated composition possesses high structural strength at a reduced cost and may selectively allow one to choose an aesthetically pleasing configuration.

3. Formation of the Bond by Compatible Aqueous Phase Chemistries

According to the compositions and methods of the present invention, preferably, a moist surface of a cement-based substrate is exposed to a carbon dioxide or carbonate source. A moist surface of a cement-based substrate is employed because the presence of the carbon dioxide or carbonate source and moisture "activates" the existing surface of a cement-based substrate. The existing surface of a cement-based substrate has been "activated" so that the surface of the cement-based substrate is given an aqueous phase chemistry compatible with (and preferably substantially similar to) the aqueous phase chemistry of the new hydrating cement-based material. Hence, when the new hydrating cement material is placed onto the surface of the cement-based substrate, an integral bond is formed therebetween the two surfaces.

The carbon dioxide or carbonate source may be any compound such that its presence in the aqueous phase chemistry of the bond interface causes the bond interface to be mechanically and chemically integral to the surface of the cement-based substrate. The term "hydration," as used herein, is intended to describe the chemical reactions that take place between the cement and water. The chemistry of hydration is extremely complex and can only be approximated by studying the hydration of pure cement compounds. For simplicity in describing cement hydration, it is often assumed that the hydration of each compound takes place independently of the others that are present in the cement mixture. In reality, cement hydration involves complex interrelated reactions of each compound in the cement mixture.

With respect to portland cement, the principal cement components are dicalcium silicate and tricalcium silicate. Portland cement generally contains smaller amounts of tricalcium aluminate ($3CaO.Al_2O_3$) and tetracalcium aluminum ferrite ($4CaO.Al_2O_3.FeO$). The hydration reactions of the principal components of portland cement are abbreviated as follows:

$$2C_3S + 6H \longrightarrow C_3S_2H_2 + 3CH \quad (1)$$
tricalcium    water    C—S—H    calcium
silicate                          hydroxide $$2C_2S + 4H \longrightarrow C_2S_2H_2 + CH \quad (2)$$
dicalcium
silicate $$C_3A + 26H + 3C\bar{S}H_2 \longrightarrow C_6A\bar{S}_3H_{32} \quad (3)$$
tricalcium    calcium    ettringite
aluminate    sulfate
             dihydrate $$C_6A\bar{S}_3H_{32} + 2C_3A + 4H \longrightarrow 3C_4A\bar{S}H_{12} \quad (4)$$
ettringite $$C_4AF + 26H + 3C\bar{S}H_2 \longrightarrow C_6AF\bar{S}_3H_{32} + C \quad (5)$$
tetracalcium
aluminum
ferrite $$C_6AF\bar{S}_3H_{32} + 2C_3AF + 4H \longrightarrow 3C_4AF\bar{S}H_{12} \quad (6)$$

where dicalcium silicate is $2CaO.SiO_2$, tricalcium silicate is $3CaO.SiO_2$, calcium hydroxide is $Ca(OH)_2$, water is $H_2O$, $\bar{S}$ is sulfate, and C-S-H ("calcium silicate hydrate") is the principal hydration product. (The formula $C_3S_2H_2$ for calcium silicate hydrate is only approximate because the composition of this hydrate is actually variable over a wide range $0.9<C:S<3.0$). It is a poorly crystalline material which forms extremely small particles in the size of colloidal matter less than 0.1 μm in any dimension.) It will be appreciated that there are many other possible hydration reactions that occur with respect to other hydraulic cements and even with respect to portland cement.

On first contact with water, C and S dissolve from the surface of each $C_3S$ grain, and the concentration of calcium and hydroxide ions rapidly increases. The pH rises to over 12 in a few minutes. The rate of this hydrolysis slows down quickly but continues throughout a dormant period. Normally, after several hours, the hydration products (CH and C-S-H) start to form, and the reaction again proceeds rapidly. Dicalcium silicate hydrates in a similar manner, but is much slower because it is a less reactive compound than $C_3S$. For additional information about the hydration reactions, reference is made to F. M. Lea, *Chemistry of Cement and Concrete* at 177–310 (3d. ed. 1978).

It has been observed that the better the contact between individual cement particles both before and during hydration, the better the hydration product and the better the strength of the bond between the particles. Hence, the positioning of cement particles in close proximity to each other before and during hydration plays an important role in the strength and quality of the final cement composite.

A major reason for the formation of the integral bond of the present invention is due to the calcium silicate hydrate which is formed at the bond interface. Different types of calcium silicate hydrates are possible in an aqueous phase. As indicated in a publication by one of the inventors, Hamlin M. Jennings, Ph.D., entitled "AQUEOUS SOLUBILITY RELATIONSHIPS FOR TWO TYPES OF CALCIUM SILICATE HYDRATE," 69 *Journal of the American Ceramic Society* 614–618 (No. 8, 1986), the type of calcium silicate hydrate observed in a hydrating cement-based material upon initial hydration may be quite different than the type of calcium silicate hydrate observed in a cement composition during the process of curing.

A metastable phase diagram based upon experimental data is presented in the above-mentioned paper by Dr. Jennings for the water-rich region of the $CaO.SiO_2.H_2O$ system. An understanding and interpretation of this experimentally generated phase diagram should assist in resolving most of the apparent conflicts in previously published data. Two metastable conditions of C-S-H are shown in FIG. 1; the aqueous phase is in a state of near equilibrium with one or the other of these two phases during hydration and curing.

Curve A can be associated in C-S-H(1), which is structurally related to tobermorite. Curve B may be associated with a structurally distinct C-S-H, which forms when $C_3$ reacts with water. The paper presents strong evidence in support of the argument that more than one type of metastable C-S-H, each with a unique structure and composition, can form during the hydration of $C_3S$. The concentration of lime and silica, in the aqueous phase of the $CaO.SiO_2.H_2O$ system, are in near equilibrium with one of the two possible phases of calcium silicate hydrate.

The foregoing graph presented in FIG. 1 is important to understand what is meant by the phrase: "the aqueous phase chemistry of the hydrating cement-based materials being compatible with the aqueous phase chemistry of the existing surfaces of the cement-based substrate." The diagram illustrates the aqueous phase chemistry of hydrating cement-based materials and the aqueous phase chemistry of the existing surfaces of cement-based substrates.

An important aspect of the present invention is that the aqueous phase chemistry of an existing surface of a cement-based substrate is modified so that its aqueous phase chemistry will lie along the curve for the aqueous phase chemistry of the hydrating cement-based materials. It has been found that by controlling the aqueous phase chemistry of the substrate surface during certain times of the hydrating process, desired qualities can be incorporated into the resultant products and an exceptionally strong bond can be achieved between the hydrating cement-based materials and the surface of the cement-based substrate.

The data in the graph of FIG. 1 is provided in an attempt to clarify and explain the compatibility of aqueous phase chemistries provided by the present invention, and it is not meant to limit the scope of the claims so recited. In FIG. 1, curve A represents the aqueous phase chemistry of an existing surface of a cement-based substrate, such as old concrete. Curve B represents the aqueous phase chemistry of hydrating cement-based materials, such as cement paste.

When the old concrete of curve A is treated according to the steps of the present invention, the aqueous phase chemistry of the old concrete no longer lies along curve A; the aqueous phase chemistry of the old concrete is modified such that it is along curve B. Because both the old concrete (i.e., the substrate) and the cement paste (i.e., the hydrating cement material) lie along curve B, the aqueous phase chemistries are compatible; in fact, the aqueous phase chemistries of both of these materials are substantially similar. It is this compatibility which leads to the improved bond between the old concrete and the new cement paste and the other novel feature to be discussed regarding the present invention.

Therefore, the term "the aqueous phase chemistry of the hydrating cement-based materials being compatible with the aqueous phase chemistry of the existing surface of the cement-based substrate" can be understood in light of the different aqueous phase chemistries represented by the curves in FIG. 1. It will be appreciated that depending upon the specific material used and the hydrating conditions, the aqueous phases of existing surfaces of cement-based substrates and hydrating cement-based materials may not fall directly along the curves as they are specifically presented in FIG. 1.

Nevertheless, the aqueous phase chemistries or modified aqueous phase chemistries should be taken in light of the principles set forth by the graph in FIG. 1 and the paper from which it originated. That is to say, it is important to modify the aqueous phase chemistry of the substrate so that it is more like that of the hydrating cement-based material. This process of modification of the aqueous phase chemistry is sometimes referred to herein as "activating" the surface of the cement-based substrate.

According to the present invention, it is possible to activate the existing surface of a cement-based substrate so that its aqueous phase chemistry is compatible to that of an adjacently placed hydrating cement-based material. Previously, were one to place the existing surface of a substrate adjacent to a hydrating cement-based material, the aqueous phase chemistry would have been so dramatically different that a mechanically and chemically integral bond could not be reproducibly formed therebetween.

The similarity between the aqueous phase chemistries of the surfaces of the cement-based substrates and the hydrating cement-based materials found in the present invention, provide the suitable environment such that an integral bond may be formed therebetween the surfaces of the cement-based substrates and the hydrating cement-based materials. It is this compatibility between the types of calcium silicate hydrates which form the integral and the strong bond between the surfaces of the cement-based substrates and the hydrating cement-based materials.

The term "integral" has been previously defined. As used in the specification and claims, the term "integral" means that the bond between the new hydraulic cement paste and the "old" concrete surface is substantially as strong as either of the adjacent component structures, i.e., the new hydraulic cement or other "old" concrete substrate.

a. Moistening

To initiate the aqueous phase chemistry at a substrate surface, it is important that some amount of moisture be present at the surface of the cement-based substrate. Generally, substrates, such as cement, mortar, or concrete, are porous in nature. Upon the introduction of a liquid to the substrate surface, the liquid is absorbed by the substrate such that there no longer exists any quantity of liquid at the surface of the substrate. If the existence of a liquid at the surface of the porous substrate is required, it is logical that one must add a sufficient amount of liquid to compensate for the absorptive nature of the porous substrate.

In the present invention, the preferred substrate is concrete which is porous by nature. Were a hydrating cement-based material to be applied to a dry concrete surface, a certain amount of liquid in the hydrating cement-based material would be absorbed by the interior of the concrete surface. Such an occurrence could result in an insufficient amount of liquid present at the bond interface between the surface of the concrete and the hydrating cement-based material to complete the hydration of the new cement or concrete material. Of course, hydration of that material is critical for imparting strength to the resulting material.

The process of the present invention includes the step of creating a moist environment at the surface of the substrate so that a sufficient amount of liquid will be present at the surface of the cement-based substrate to create the appropriate aqueous phase chemistry and absorb the carbon dioxide or carbonate source. The hydration reactions are then allowed to react at the surface of the cement-based substrate so that upon hydration of the new hydrating cement-based material at the bond interface, the proper product is formed. The step of creating a moist environment can be accomplished by the direct application of an aqueous liquid at the surface of the cement-based substrate before the application of the hydraulic cement paste composition.

Alternatively, a hydrating cement-based material having a sufficiently high amount of water, to compensate for the absorptive tendencies of the cement-based substrate, can be applied to the surface of the cement-based substrate. One will appreciate it will be more difficult to control the activation and composition of the resulting product, and to assure consistency in the properties of the resulting product.

Moreover, as it will be discussed hereinafter in greater depth, before the hydrating cement-based material is applied to the surface of the cement-based substrate, the surface of the cement-based substrate will need to be exposed to a carbon dioxide or carbonate source. Thus, even if a portion of the aqueous liquid comprising the hydrating cement-based material were absorbed by the cement-based substrate, there would be a sufficient amount of liquid residing in the hydrating cement-based material to initiate a hydration reaction between the surface of the cement-based substrate and the hydrating cement-based material. Preferably, the step of moistening the surface of a cement-based substrate and the step of exposing the surface of the cement-based substrate to a carbon dioxide or carbonate source are conducted as separate steps.

The amount of moisture present at the surface of the cement-based substrate is that amount necessary to initiate a hydration reaction. While only a few molecules of a liquid may be necessary to initiate the hydration reaction, it may be required that a greater amount of moisture should be present at the surface of a cement-based substrate. Generally, an exact amount of moisture is not necessary, and in a practical application of moisture in the present invention you wet the existing surface of the substrate and then squeegee the surface.

The term "squeegee" as used throughout this specification is defined to mean to smooth, wipe, or treat with a squeegee.

A squeegee is defined in *Webster's Ninth New Collegiate Dictionary* as a blade of leather or rubber or the equivalent set on a handle and used for spreading, pushing, or wiping liquid material on, across, or off a surface. Generally, squeegeeing can be defined as physically working enough water onto a surface to create a dampened state, but removing excess water from the surface such that droplets of moisture are not present.

b. Activation

According to the preferred compositions and methods of the present invention, the existing surface of the cement-based substrate is exposed to the carbon dioxide or carbonate source after preparation of a moist environment at the surface of the cement-based substrate. This is followed by the application of the hydrating cement-based material to the surface of the cement-based substrate. The presence of the carbon dioxide or carbonate source creates an aqueous phase chemistry condition in which an amorphous noncrystalline material that has an absence of large voids in the region of the bonding layer creates the mechanically and chemically integral bond to the surface of the cement-based substrate. The preferred treating source is in gaseous form such as carbon dioxide, carbon monoxide, and the like.

Although the use of carbon dioxide gas has been discussed as a preferred carbon dioxide or carbonate source to be employed in the present invention, it should be understood that the present invention is not limited as such. Instead, as previously noted, other gases that are comprised of carbon can be employed as a carbon dioxide or carbonate source.

The introduction of carbon-based gases into the moist environment at the surface of the cement-based substrates allows for the formation of carbonates in the moist environment. It is believed that the presence of carbonates at the surface of the cement-based substrates contributes to the creation of the compatibility between the aqueous phase chemistries of the existing cement-based substrate and the hydrating cement-based materials of the present invention. The formation of carbonates by the carbon-based gases in the moist environment can be affected by the pH of the moist environment.

Preferably, it has been found that with proper application of a carbon dioxide or carbonate source (such as carbon dioxide, carbon monoxide, sodium bicarbonate, sodium carbonate, or other materials capable of generating such activating carbon dioxide or carbonate) to the surface of a cement-based substrate, hydrating cement-based materials can mechanically, chemically, and integrally bond to the surface of the cement-based substrate. The bond formed therefrom is not comprised of bonding agents previously known in the art (typically, noncementitious organic additives to the new hydrating cement paste).

According to the preferred embodiment of the present invention, the moist surface of a cement-based substrate is exposed to the carbon dioxide gas in order to create a proper aqueous phase chemistry for bond formation. (While the following discussion uses carbon dioxide gas as the exemplary treating materials, it will be appreciated that this discussion is applicable to other carbon dioxide or carbonate sources as referred to above.) While the concentration of the carbon dioxide gas may vary, the concentration of the carbon dioxide gas should at least be at atmospheric concentrations or greater such that the aqueous phase chemistry at the surface of the substrate is made compatible with the aqueous phase chemistry of the surface of the cement-based substrate (as discussed and defined above).

The introduction of the carbon dioxide or carbonate source is performed at the surface of the cement-based substrate. Nevertheless, the introduction of the carbon dioxide or carbonate source can be performed at a distance from the surface of the cement-based substrate. The goal of the present invention is to introduce a sufficient quantity of the carbon dioxide or carbonate source to the moist surface of the cement-based substrate that the hydrating cement-based materials may be thereby bound (i.e., the amount of carbon dioxide presented to the surface of a substrate may depend on the distance between the carbon dioxide-emitting source and the surface of the substrate). The object of this process is to modify the aqueous phase chemistry at the surface of the substrate to match the aqueous phase chemistry of the hydraulic cement paste composition.

The time which the moist surface of the substrate is exposed to the carbon dioxide gas should also be noted. The moist surface of the cement-based substrate should be exposed to the carbon dioxide gas for a time period sufficient to allow the aqueous phase chemistry to form so that the bond interface formed after the hydrating cement-based material is applied to the surface of the cement-based substrate is mechanically and chemically integral with the surface of the cement-based substrate. Typically, it has been found that only a short time is necessary, as demonstrated in the examples of the present invention which follow.

It should also be noted that carbonates may be presented to the surface of the cement-based substrate at substantially the same time as the moistening step. In this embodiment of the present invention, the application of a carbonated solution to the surface of the cement-based substrate will create the moist environment at the surface of the cement-based substrate, while also providing the carbon dioxide or carbonate source. Thus, the moistening and exposure of the surface of the cement-based substrate to a carbon dioxide or carbonate source can be conducted in one step.

In this embodiment, it would be preferred to introduce a solution containing sodium carbonate as the carbonated solution. Nevertheless, any carbonated solution known to those skilled in the art may be employed. It is only important that the carbon-based source capable of forming a carbonate be present at the moist surface of a cement-based substrate so that the aqueous phase chemistry of the surface is modified to be compatible with the aqueous phase chemistry of any hydrating cement-based materials to be placed thereon.

c. Application of Hydrating Cement-Based Materials

The present invention further comprises the step of applying a hydrating cement-based material to the activated surface of the substrate. Characteristically, a hydrating cement paste or concrete mass is applied directly to the activated surface of a substrate. Nevertheless, any hydrating cement-based material discussed heretofore in this application may be applied to the activated surface of the substrate.

In the preferred embodiment of the present invention, a layer of cement paste, subsequently followed by a layer of hydrating concrete, is applied to the activated surface of a substrate. For improved results, this cement paste layer has a low water-to-cement content (i.e., a low water/cement ratio). The fresh concrete layer subsequently applied requires no special processing requirements. In additional embodiments of the present invention, a plurality of layers of hydrating cement-based compositions are applied to the activated surface of a substrate. The application of the layers of hydrating cement-based compositions is at different times or simultaneously. Also, it is preferred that different types of hydrating cement-based compositions be applied as a plurality to the activated surface of a substrate.

In another embodiment of the present invention, the application of a hydrating cement-based material to the surface of a substrate includes the step of applying a hydrating cement-based material that includes microsilica to the surface of a substrate. A predetermined amount of microsilica in the range from about 0.1 to about 0.4 by weight microsilica/cement may be included in the hydrating cement-based material. In a preferred embodiment of the present invention, a predetermined amount of microsilica in the range from about 0.15 to about 0.35 by weight microsilica/cement is included in the hydrating cement-based material. In the most preferred embodiment of the present invention, a predetermined amount of microsilica in the range from about 0.2 to about 0.3 by weight microsilica/cement is included in the hydrating cement-based material.

According to the present invention, the microsilica is added to the cement paste before the cement paste is applied to activate the surface of the substrate. Nevertheless, the use of the microsilica is not restricted to this single approach. It is believed that the microsilica reacts with any calcium hydroxide present at the bond interface to form the amorphous noncrystalline material which has a reduced number of void fractions normally present at the bond interface. A characterization of the bond interface follows at section 4.

d. Mixing Cement Paste

The preparation of the hydrating cement-based materials of the present invention comprises the step of mixing the hydraulic cement paste composition. Mixing is preferably accomplished by use of a high energy mixer of the type disclosed in U.S. Pat. No. 4,944,595 issued to Simon K. Hodson on Jul. 31, 1990, entitled, "APPARATUS FOR PRODUCING CEMENT BUILDING MATERIAL."

U.S. Pat. No. 4,944,595 discloses equipment which is capable of achieving substantially complete hydration of the hydrating cement-based materials through the use of intense homogenous mixing of cement and water. The result is a building material of improved strength, handling characteristics, and overall performance. The building material has fewer random entrapped air voids, a greater homogeneity of hydrated compounds, fewer partial or incomplete hydrated compounds, and a more fully developed homogenous monolithic crystalline structure.

The cement paste generator of U.S. Pat. No. 4,944,595 employs a hollow generally cylindrical housing. Disposed in the radial center of the housing is a rotatable shaft, having its upper end coupled to a shall rotating mechanism. By choosing certain operating parameters and certain dimensions of the components of the generator to be within critical ranges, a novel homogenous paste is generated which when cured by ASTM (American Society for Testing and Materials) standards, provides a superior crystalline building material. Moreover by adding aggregates to the homogeneous paste, and then mixing again, a superior performance concrete is formed following curing.

The use of the cement paste generator (or high energy mixer) for mixing is a preferred embodiment of the present invention because its use results in a consistent and reproducible cement paste with predetermined, high quality properties. Moreover, the use of the cement paste generator is preferred because the high energy mixer breaks apart and thoroughly disperses the cement, and any other aggregates in the cement paste, resulting in a reduction of clumps. Nevertheless, other types of mixing techniques known in the art may be employed.

The inventors have found that the use of hydrating cement-based materials obtained by the use of the high energy mixer for making the cement paste are in a supersaturated condition with respect to certain ions like calcium. It is believed that this supersaturated condition of certain ions may provide a type of aqueous phase chemistry which is preferably compatible to the surface of the old substrate.

Nevertheless, the use of the present invention is believed to place the surface of the existing concrete substrate in a supersaturated condition with respect to similar ions as obtained through the use of the high energy mixer for making the cement paste. The application of carbon dioxide to a moist surface of a substrate is believed to create an aqueous phase chemistry at the surface of the substrate which is compatible with hydrating cement-based materials because of the supersaturated condition of some ions. Thus, placing either the hydraulic cement paste composition, the surface of the substrate, or both, in this supersaturated condition with respect to certain ions in the aqueous phase chemistry like calcium may explain the operation of the present invention.

It is believed that the cement paste manufactured in a high energy mixer aids in the bonding process of the present invention. Essentially, the high shearing action of the high energy mixer breaks up and disperses paste agglomerates. The application of cement paste manufactured in a high energy mixer to old concrete surfaces results in a bond interface therebetween which is stronger than a bond interface formed between concrete surfaces and cement compositions not manufactured in a high energy mixer.

e. Cleaning Existing Surfaces of Cement-Based Substrates

The methods of the present invention for improving the bond strength between hydrating cement-based materials and existing surfaces of cement-based substrates further includes the step of cleaning the surface of the existing cement-based substrates. Cleaning can be accomplished through a variety of ways known to those skilled in the art. In the present invention, one may physically brush off particulates or powder from the surfaces of the existing cement-based substrates.

The step of cleaning is performed to further improve the bond formed between the hydrating cement-based materials and the existing surfaces of the cement-based substrates. It is no surprise that the step of cleaning allows for greater contact between the new and old cement-based structures such that the strength of the bond formed therebetween is improved.

f. Scrubbing or Working the Hydrating Cement Paste Into the Surface of the Existing Cement-Based Substrates The methods of the present invention for improving the bond strength between the hydrating cement-based materials and existing surfaces of cement-based substrates further preferably includes the step of scrubbing or working the hydrating cement paste into the surface of the existing cement-based substrates. Scrubbing can be accomplished through a variety of ways known to those skilled in the art. In the present invention, one may hard scrub, with a brush, the surfaces of the existing cement-based substrates or merely squeegee or trowel the hydrating cement paste on and "into" the surfaces of the existing substrate.

It is believed by the inventors that the application of the hydrating cement paste to the surfaces of the existing cement-based substrates reduces the presence of air at the bond interface. The presence of air, which can create void fractions, is a cause for low bond strength at the bond interface. Whereas the application of cement paste to the surface of the existing cement-based substrates is one embodiment of the present invention, it can be understood that the step of working the cement paste into the surface of the substrate increases the replacement of air at the bond interface with cement paste. This additional preferred step, therefore, leads to an increased bond strength at the bond interface since void fractions are decreased or eliminated.

It is important to note that the existing surfaces of the substrates are not directly scrubbed, but instead the hydraulic cement paste portion of the hydrating cement-based material is scrubbed indirectly into the surface of the cement-based substrate.

4. Characterization of the Bond Interface

The bond interface found between the existing surface of the cement-based substrate and the hydrating cement-based material can be characterized in many ways. Significant is the mechanical and chemical integrity of the bond interface to the existing surface of the cement-based substrate. By use of the term "mechanical and chemical integrity," it should be understood that the bond formed between the existing surface of the cement-based substrate and the hydrating cement-based material is as structurally sound as (if not stronger than) either the existing substrate or the hydrating cement-based material after it has cured for a period of time.

In other words, if stresses are applied to the area about the bond interface, there is as much a chance that the cement-based substrate or hydrating cement-based material will break as there is of the bond breaking. The advantages of such a bond can be appreciated by anyone who has ever attempted to repair a crack in a cement driveway, or attempted to form a bond at a cold joint area, and desires the bond to be of a permanent nature.

The mechanical and chemical integrity of the bonding interface depends primarily on its mechanical strength in the set and hardened condition, a strength due to the cohesion of the particles of cement in the bond and to their adhesion to the bonding surfaces. The quality and strength of the bond depends upon the conditions employed in the bond formation. Importantly, the mechanical integrity of the bond interface is maintained when subjected to stresses. The stresses may be shear, tensile, compression, and the like.

Mechanical strength tests play a most important part in determining the quality and strength of the bond. Strength tests typically take three different forms. A specimen may be subjected to tension, compression, or bending tests. Whereas these tests are commonly employed, other types of strength tests known to those skilled in the art may also be employed.

The bond interface formed between the existing surface of the cement-based substrate and the hydrating cement-based materials can also be characterized by the absence of organic bonding agents, such as epoxies and the like (for the purposes of this invention, "organic bonding agents" has been defined to exclude carbon dioxide or the carbonate source). The formation of bonds between two surfaces through the use of epoxies has a tendency to become unbonded upon the application of stresses. This result is undesirable because the surfaces required to be bonded will constantly be under repair.

The formation of bonds between two surfaces through the use of epoxies is undesirable for an additional reason. The incorporation of epoxies into a bond interface can be financially expensive: they are simply not economically practical for large projects. The high cost represented by their use, when compared to the use of the relatively inexpensive carbon dioxide, according to the processes outlined by the present invention, make the use of epoxies undesirable.

Still further, the formation of bonds between two surfaces through the use of epoxies is undesirable due to the solubility of organic epoxies. Because they are soluble, the epoxies present in formed bonds will dissolve in the presence of a soluble agent, usually water, and withdraw from the bond area. The withdrawal of the epoxies from the bond area will result in increased void fractions at the bond area, which correspondingly will result in a weakened bond between the two surfaces.

The present invention employs a process which comprises the step of using inexpensive carbon dioxide to form a bond between a surface of a substrate and a hydraulic cement paste composition. The bond is mechanically stable over a long period of time, is water insoluble, and eliminates any discontinuity thus allowing the two laminate pieces to form a monolithic structure. Indeed, the presence of extra water merely goes to continue the hydration process which may take many years to reach its maximum cured potential.

Thus, in light of the undesirability of using epoxies, it can be seen that the compositions and processes of the present invention for improving the bond between hydrating cement-based materials and the existing surfaces of cement-based substrates which do not require the use of epoxies, or other bonding agents is novel.

Still further yet, the formation of the bond between the hydrating cement-based materials and the surface of the substrates is characterized by the reduction of void space occurring therebetween, or in other words by an absence of pores. Generally, pores are formed along the bond; these pores are of at least two different types. The first type of pore, "macropores," is formed as a result of the presence of aggregates in the hydrating cement-based materials which press against the surface of the substrate and prevent the necessary hydration reaction products to form. Macropores are generally visible to the naked eye or under magnification of less than about 10X. Depending upon the size of the aggregates, the pore sizes will generally be as large as about 1 to 4 mm. in size.

In traditional cement bonds, the air voids within two millimeters of the bond interface in the new cement material have a typical size greater than about 0.5 mm. Also the percent of total air within 5 mm. of the bond interface is much greater in the prior art bonded materials. It is anticipated that most prior art bonds would have a volume of greater than about 10% air voids.

The second type of pore formed in the bond is a result of the chemistry of the microstructure of the bond. Generally referred to as "micropores," this type of pore is formed as a result of the production of air pockets at the bond interface. "Micropores" are not generally visible by the naked eye, but need magnification of about 50X or greater to be evaluated. The size of this type of pore will vary down to the angstrom level.

An analysis of the typical void size in the integral bonds of the present invention show that greater than 90% of all voids are less than 0.15 mm. in diameter. Furthermore, the total air content of the interface is only a fraction of that of the prior art cement. In the present invention, the size of the macropores and trapped air as a result of chemical reactions in the microstructure are decreased or eliminated.

The low void fractions present at the bond interface, or in other words, the elimination of the macropores and the decreased size of the micropores, is due to the presence of amorphous noncrystalline materials at the bond interface.

The reduction of void fractions at the bond interface due to the presence of amorphous materials is contrary to prior art attempts at reducing void fractions.

Previously, others have removed large pores at the bond interface by eliminating any air trapped therein. These prior attempts did not remove trapped air and replace the void with an amorphous microstructure as does the present invention.

Another reason for the low void fractions present at the bond interface is the high degree of carbonation of the cement-based substrate surface due to the carbon dioxide or carbonate source. The carbonation extends from the surface of the existing substrate to the new hydrating cement-based material. The extension of the carbonation is similar to the curing process, except that the carbonation extends from inside out, as opposed to outside in. This extension of carbonation leads to an identifiable boundary region by micrograph examination.

It is believed that the mechanical integrity resulting from the formation of the novel bond interface of the present invention relates to the location of the calcium-silicone hydrates found in the aqueous phase chemistry of the hydraulic cement paste composition. Generally, the calcium, silica, and water provided by a hydraulic cement paste composition will not precipitate on the surface of an existing substrate. Instead, the calcium, silica, and water will reprecipitate on the surface of the compounds found in the hydraulic cement paste composition. The reason for this occurrence pertains to the incompatibility of the aqueous phase chemistries of the surface of the substrate and the hydraulic cement paste composition.

It has been determined that where the aqueous phase chemistries of the surface of the substrate and the hydraulic cement paste composition differ, normally precipitated products, which begin to grow towards the surface of a substrate, will discontinue their advancement. Long before the precipitates reach the surface of the existing substrate, the formation of the precipitates stop, and there is a shrinkage—an evaporation—that occurs during hydration. It is at this time that a gap forms between the surface of the substrate and the precipitates of the hydraulic cement paste composition.

The gap is the reason for the nonintegral bonding and weak bond strength between previously known existing substrates and hydraulic cement paste compositions. Within this gap, a band of calcium hydroxide forms due to the failure of the calcium-silicate hydrate to form therein. This band of calcium hydroxide is weak in structure and is the cause of the weak bond strength between old and new surfaces.

Due to the preparation steps of the present invention which create a suitable environment, or aqueous phase chemistry, at the surface of a substrate, the bond interface between the surface of the substrate and the hydraulic cement paste composition experiences the precipitation of calcium-silicate hydrates therein.

The aqueous phase chemistry of the surface of the substrate is such that the ions and compounds found in the aqueous phase of the hydraulic cement paste compositions are drawn into the aqueous phase chemistry created at the surface of the substrate in order to form the precipitates right at or on the surface of the substrate. The precipitates continue to grow until the "plastic phase," or hydration, reactions are substantially discontinued. Because there is growth of precipitates throughout the bond interface, the weak calcium hydroxide band is not allowed to form significantly.

Due to the foregoing, one is unable to distinguish between calcium-silicate hydrate crystals occurring in the bond interface. The two types of precipitates eventually grow into each other. The result is both an ionic and covalent type bonding which, therefore, provides for the high bond strength, and the mechanically integral bond with the surface of a substrate claimed herein.

As indicated above, the bond interface may also be characterized by a reduction in calcium hydroxide concentrations. Bonds formed by processes unrelated to the present invention experience the presence of high calcium hydroxide concentrations. In the present invention, the bond interface is characterized by the presence of low calcium hydroxide concentrations.

The bond interface between the existing surface of the cement-based substrate and the hydrating cement-based materials can further be characterized by a low water/cement ratio when compared to the surface of the cement composition comprising the bond interface. Generally, most prior art bond interfaces are not characterized as such. The lower water/cement ratio at the bond interface has the effect of putting the interface matrix in compression with respect to the surface of the cement composition. This effect reduces the "curling up" tendencies and stresses that normally occur in prior art bond interfaces.

Moreover, the bond interface between the existing surface of the cement-based substrate and the hydrating cement-based materials can further be characterized by micro-cracks which cross the bond interface but are not propagated parallel to the bond interface. This result is important to indicate that the bond is not the nearest plane susceptable to breaking. Most prior art bonds can be characterized by micro-cracks which are propagated parallel to the bond interface, indicating that the bond is susceptable to breaking.

Still further, the bond interface between the existing surface of the cement-based substrate and the hydrating cement-based materials can be characterized as being thin. The term "thin" as defined in this invention is meant to distinguish the bond overlay of the present invention from prior art bond overlays which can be four inches thick or greater. The bond interface of the present invention may, however, be only 1 mm thick. Another objective determination of the thickness of the bond interface of the present invention, which may be recognized by those skilled in the art is that the bond overlay is essentially painted over the surface of the existing surface of the cement-based substrate.

5. Examples

Various hydraulic cement compositions and their methods of manufacture within the scope of the present invention will be further clarified by a consideration of the following examples, which are intended to be purely exemplary of the use of the invention and should not be viewed as a limitation on any claimed embodiment.

Example 1

Five hundred square feet of a concrete pavement approximately 20 years old was observed to have surface deterioration due to natural freeze-thaw cycles and vehicular traffic. The pavement was approximately four inches thick and was characterized by core samples as having a typical compressive strength of approximately 4000 psi. Some cracking had occurred in the surface due to settling.

The surface of the entire cement surface was washed with high pressure (approximately 30 psi) water and swept clean of surface debris, dirt, and other contaminates. The surface was then treated with carbon dioxide gas from a portable tank at a close range so as to expose the entire wet surface to the gas.

Approximately one inch of freshly mixed concrete (having a maximum aggregate size of less than ¼ of an inch and a design strength of approximately 4000 psi) was poured on top of the surface of the old cement. During pouring and spreading, careful attention was given to be sure that the fresh concrete was in contact with the old surface; this was done by using a rake, squeegee, and/or brush. The new concrete was then screeded and finished to give a new surface.

After 28 days, the surface was cored and samples prepared to determine the strength of the bond. The compressive strength of the samples was in all cases greater than 4000 psi, and at no point did the material fail at the bond interface. The samples were also broken in flexure; flexural strength was approximately 650 psi. Again, at no point did any sample fail at the bond interface. Hence, the bond at the interface of the new cement and the old concrete pavement was deemed to be stronger than either the new cement or the old concrete pavement.

Example 2

One thousand square feet of a concrete pavement approximately twelve years old was observed to have surface deterioration due to natural freeze-thaw cycles and vehicular traffic. The driveway was characterized by core samples as having a typical compressive strength of approximately 5000 psi and was approximately four inches thick. Some cracking had occurred in the surface due to settling.

The surface of the entire pavement was washed with high pressure (approximately 30 psi) water and swept clean of surface debris, dirt and other contaminates. The surface was then treated with carbon dioxide gas from a portable tank at a close range so as to expose the entire wet surface to the gas.

Approximately ¼ inch of freshly mixed concrete having a maximum aggregate size of less than ¹⁄₁₆ of an inch (20 mesh sand) was poured on top of the surface. During pouring and spreading, careful attention was given to be sure that the fresh concrete was in contact with the old surface. This was done by using a rake, squeegee, and/or brush. The new concrete was then screeded and finished to give a new surface.

After 28 days, the surface was cored and samples prepared to determine the strength of the bond. The compressive strength of the samples was in all cases greater than 5000 psi, and at no point did the material fail at the bond interface. The samples were also broken in flexure. Flexural strength was approximately 800 psi. Again, at no point did any sample fail at the bond interface. Hence the bond at the interface of the new cement and the old cement was deemed to be stronger than either the new cement or the old concrete pavement.

Example 3

A concrete road pavement approximately 25 years old was observed to have surface deterioration. The pavement was characterized by core samples as having a typical compressive strength of approximately 4500 psi and was approximately eight inches thick. Some cracking had occurred in the surface due to settling.

The pavement surface was washed with water and swept clean of surface debris, dirt, and other contaminates. The surface was then treated with carbon dioxide gas from a portable tank at a close range so as to expose the entire wet surface to the gas.

Approximately three and one-half inches of freshly mixed concrete having a maximum aggregate size of less than ¾ of an inch and a design strength of approximately 4500 psi was poured on top of the surface. The concrete was prepared using a High Energy Mixer manufactured by Concrete Technology Corporation of Santa Barbara, Calif., to premix the paste fraction of the fresh concrete before combining with aggregates. During pouring, spreading, and screeding, careful attention was given to be sure that the fresh concrete was then finished according to standard procedures to give a new surface.

After 28 days the surface was cored and samples prepared to determine the strength of the bond. The compressive strength of the samples was in all cases greater than 4500 psi, and at no point did the material fail at the bond interface. The samples were also broken in flexure. Flexural strength was approximately 700 psi. Again, at no point did any sample fail at the bond interface. Hence, the bond at the interface of the new cement and the old concrete pavement was deemed to be stronger than either the new cement or the old concrete road pavement.

Example 4

Five hundred square feet of a concrete driveway approximately 20 years old was observed to have surface deterioration due to natural freeze-thaw cycles and vehicular traffic. The driveway was characterized by core samples as having a typical compressive strength of approximately 3000 psi and was approximately four inches thick. Some cracking had occurred in the surface due to settling.

The surface of the entire surface was washed with high pressure (approximately 30 psi) water and swept clean of surface debris, dirt, and other contaminates. The surface was then treated with carbon dioxide gas from a portable tank at a close range so as to expose the entire wet surface to the gas.

A 0.35 water/cement ratio premixed cement paste was "painted" over the entire surface in a very thin coating, and then fresh concrete was poured onto the paste coated surface. The fresh concrete layer was approximately one inch thick, the concrete having a maximum aggregate size of less than ¼ of an inch and a design strength of approximately 3000 psi. During pouring, spreading, and screeding, careful attention was given to be sure that the cement paste was in contact with the old surface. This was done by using a squeegee. The new concrete was then finished, screeded, and troweled to give a new finish surface.

After 28 days, the surface was cored and samples prepared to determine the strength of the bond. The compressive strength of the samples was in all cases greater than 3000 psi, and at no point did the material fail at the bond interface. The samples were also broken in flexure. Flexural strength was approximately 650 psi. Again, at no point did any sample fail at the bond interface. Hence, the bond at the interface of the new cement and the old concrete driveway was deemed to be stronger than either the new cement or the old concrete driveway.

Examples 5–10

Figure 2:
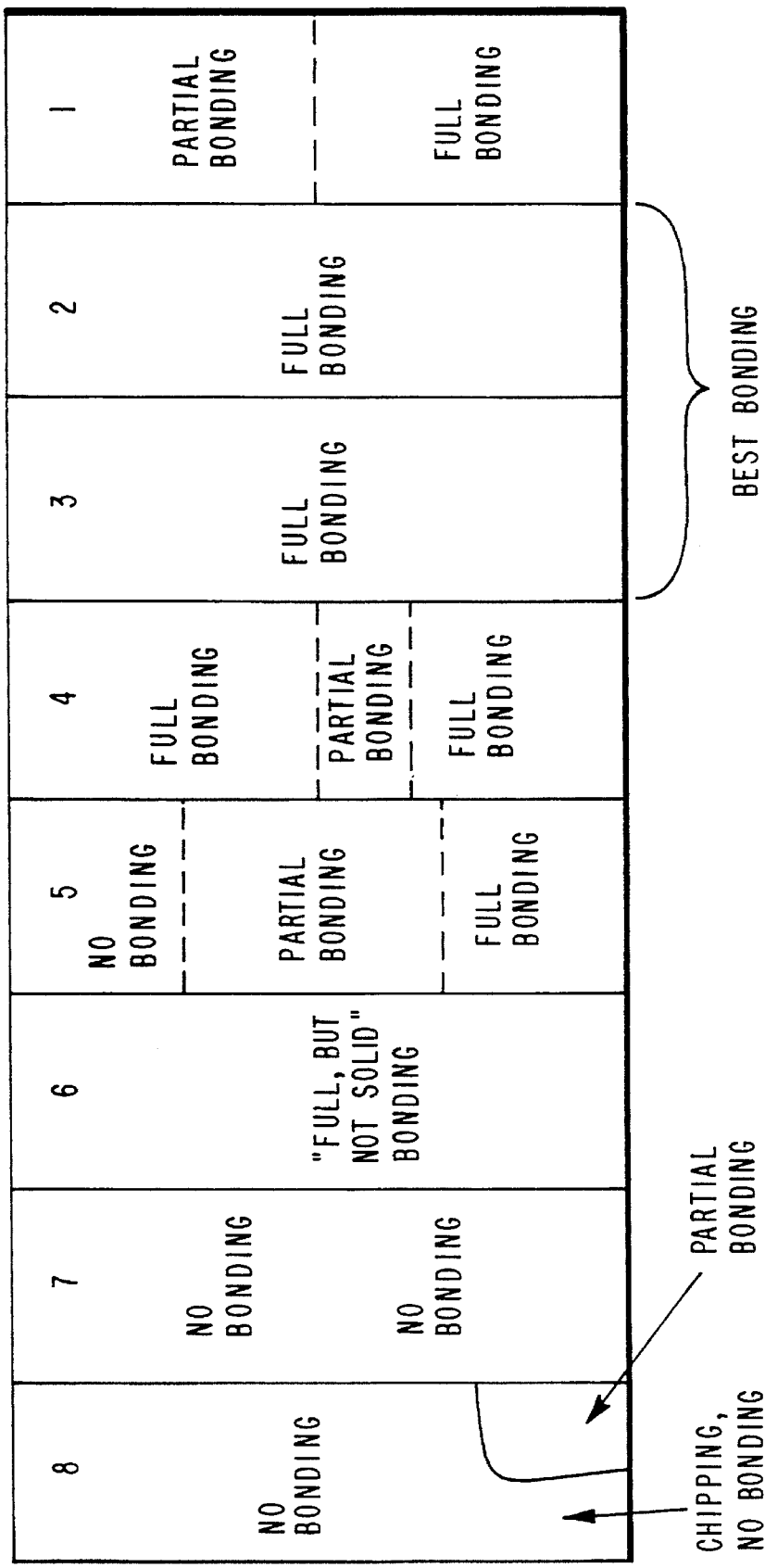
FIG. 2 is a graph representing the different mix designs for the thin-bonded overlay tests conducted in Examples 5–10.

The experimental motivation for this example was to determine the effectiveness of various mix designs for use as thin-bonded overlay ("TBO") materials. The concrete skirt of the driveway behind a house was cleaned with tap water and scrubbed. The skin was divided into six sections of approximately equal area (2'×4') to test six different mix designs for use as TBO materials. The "map" of the test, along with the mix design that correlated with each area, is shown in FIG. 2 and is summarized as follows:

| Example No. | Test Section | TBO Material |
| --- | --- | --- |
| 5 | 1 | Paste prepared in a HEM was added to mortar prepared with paste mixed in a HEM. |
| 6 | 2 | Mortar prepared with paste mixed in a HEM. |
| 7 | 3 | Mortar prepared with paste mixed with $CO_2$ in a HEM. |
| 8 | 4 | Mortar mixed entirely in a drum mixer. |
| 9 | 5 | Mortar prepared with paste mixed in a HEM. |
| 10 | 6 | Paste mixed in a HEM which is mixed with mortar mixed entirely in a drum mixer. |

("HEM" refers to the use of the Concrete Technology Corporation's High Energy Mixer to make the cement paste.) Sections 1–4 were treated with $CO_2$ gas immediately before their respective mix designs were laid down. Eight days later, each section was tapped to test for bond adhesion. Bonds were rated as either full, partial, or unsuccessful.

In the preferred embodiment of preparing an HEM cement paste by high energy mixing, a 0.4 ratio of cement to water is placed in a high energy mixer for about one minute. Initially, only water is present in the high energy mixer, but subsequently, cement is added to the water over a thirty second period. After the cement is completely added to the water, the 0.4 ratio of cement to water is mixed by the high energy mixer for a period of about thirty seconds. The discharged paste is the HEM cement paste.

FIG. 3 shows how the six regions of the driveway performed under tapping. Note that HEM mortar was mortar prepared with HEM premixed paste, and drum mortar was mortar mixed entirely in the drum mixer. All mortars had a water to cement ratio of 0.55, and pastes had a water to cement ratio of 0.5. The cement type used in the new cement was the brand "Continental." The qualitative ranking of mix design bond effectiveness went as follows (from best to worst):

HEM mortar+$CO_2$ surface treatment (Example 6)
HEM paste and HEM mortar+$CO_2$ surface treatment (Example 5)
HEM $CO_2$ mortar+$CO_2$ surface treatment (Example 7)
HEM mortar only (Example 9)
Drum mortar+$CO_2$ surface treatment (Example 8)
HEM paste//Drum mortar (Example 10)

It is to be noted that the three drum mortars adhered the worst of all mix designs, while HEM mortar always bonded, at least to some degree. This seems to indicate that the HEM itself aids the TBO process. Therefore, the application of HEM cement compositions to old concrete surthces would result in a bond interface therebetween which is stronger than a bond interface formed between concrete surfaces and non-HEM cement compositions.

Also significant is the fact that there is an increase in bond strength when $CO_2$ gas was applied to the concrete surface. Hence, the presence of $CO_2$ gas leads to the formation of a bond interface between old concrete surfaces and hydrating cement-based compositions wherein the bond is deemed to be stronger than bond interfaces formed between old concrete surfaces and hydrating cement-based compositions in the absence of $CO_2$. These facts, taken as a set, seem to indicate that TBO in both a physical and chemical phenomenon.

Examples 11–19

The experimental motivation for these examples was to further determine the effectiveness of various mix designs for use as thin-bonded overlay ("TBO") materials. A matrix was designed to test slant-shear bond strength, and evaluate the following variables in a thin bonded overlay over an existing concrete surface:

1) a wet or dry surface;
2) exposure to carbon dioxide or normal atmosphere; and
3) application of different types of pastes prior to the application of new concrete to the activated surface (no paste, HEM paste, HEM paste mixed with microsilica)

The water/cement ratio of the cement paste was 0.40 (by weight), and the concrete overlay had a water/cement ratio of 0.45.

One example of a way to measure the bonding strength between two concretes is the slant-shear test suggested in an article by F. Saucier et al., "A Combined Shear-Compression Device to Measure Concrete-To-Concrete Bonding," *Experimental Techniques* 50–55 (Sept/Oct. 1991). In the slant-shear test, typically a three inch diameter by six inch long concrete cylinder (i.e., the "old concrete") is cut in half diagonally along a sixty degree angle. The now dissected cylinder is then placed into a new three inch by six inch cylinder cup and fresh concrete is bonded to the old concrete.

After spending one day in the cylinder, the now bonded concrete halves are placed in a holding tank containing saturated lime water and later tested in compression at seven days. The shear strength of the bond is equal to the measured compressive strength multiplied by a geometric factor of 0.433.

The mix designs of each example is summarized as follows:

| Example No. | Compressive Strength | TBO Material |
| --- | --- | --- |
| 11 | 3051 psi | New concrete was applied to a dry concrete surface unexposed to carbon dioxide or paste. |
| 12 | 3776 psi | New concrete was applied to a wet concrete surface exposed to only carbon dioxide, but not cement paste. |
| 13 | 4223 psi | New concrete was applied to a wet concrete surface exposed to carbon dioxide and HEM paste. |
| 14 | 3644 psi | New concrete was applied to a dry concrete surface exposed only to HEM paste, but not carbon dioxide. |
| 15 | 4933 psi | New concrete was applied to a wet concrete surface exposed only to HEM paste, but not carbon dioxide. |
| 16 | 4418 psi | New concrete was applied to a dry concrete surface exposed to carbon dioxide and HEM paste. |
| 17 | 5224 psi | New concrete was applied to a dry concrete surface exposed only to HEM paste containing microsilica, but not to carbon dioxide. |
| 18 | 5984 psi | New concrete was applied to a wet concrete surface exposed to carbon dioxide and HEM paste containing microsilica. |
| 19 | 5650 psi | A contiguous cylinder of concrete. |

The previous examples illustrated that a paste interface resulted in a bond overlay of compressive strength which is comparable to controls which featured no bond, but a contiguous cylinder of concrete. Thus, unlike previous examples, the use of both a paste interface between the surface of a substrate and a hydrating cement-based material other than cement paste, such as new concrete, resulted in a bond overlay having an unexpected high compressive strength. This application of a plurality of hydrating cement-based materials to the surface of a substrate was significant.

The qualitative ranking of mix design bond effectiveness can be discerned by comparing the compressive strength results of each mix design. The application of HEM paste containing microsilica and carbon dioxide to a wet concrete surface resulted in a bond having a compressive strength greater than the compressive strength of a contiguous cylinder of concrete which acted as a control. It could also be seen that the application of HEM paste containing microsilica, without carbon dioxide, to a dry concrete surface resulted in a bond having a compressive strength similar to the compressive strength of the contiguous cylinder of concrete. Moreover, each of the mix designs which employed the use of carbon dioxide, or HEM paste, or microsilica, or a combination of the foregoing resulted in a bond having a compressive strength greater than the mere application of new concrete to a dry concrete surface.

Whereas the exposure of the surface of a substrate to each of the following factors: (1) moisture, (2) carbon dioxide, (3) HEM cement paste, and (4) microsilica, were key to increasing the compressive strength of the overlay bond, as shown in example 18, the combination of these factors resulted in a bond overlay having compressive strength which was superior to the concrete materials themselves.

Examples 20–29

The experimental motivation for these examples was to further determine the effectiveness of various mix designs for use as thin-bonded overlay ("TBO") materials similar to Examples 11–19. but were examined for compressive strength after 28 days, instead of 7 days.

The mix designs of each example is summarized as follows:

| Example No. | Compressive Strength | TBO Material |
| --- | --- | --- |
| 20 | 5168 psi | New concrete was applied to a dry concrete surface unexposed to carbon dioxide or paste. |
| 21 | 4976 psi | New concrete was applied to a wet concrete surface exposed to only carbon dioxide, but not cement paste. |
| 22 | 5716 psi | New concrete was applied to a wet concrete surface exposed to carbon dioxide and HEM paste. |
| 23 | 4627 psi | New concrete was applied to a dry concrete surface exposed only to HEM paste, but not carbon dioxide. |
| 24 | 6201 psi | New concrete was applied to a wet concrete surface exposed only to HEM paste, but not carbon dioxide. |
| 25 | 5818 psi | New concrete was applied to a dry concrete surface exposed to carbon dioxide and HEM paste. |
| 26 | 8408 psi | New concrete was applied to a dry concrete surface exposed only to HEM paste containing microsilica, but not to carbon dioxide. |
| 27 | 8568 psi | New concrete was applied to a wet concrete surface exposed to carbon dioxide and HEM paste containing microsilica. |
| 28 | 7392 psi | A contiguous cylinder of concrete (overlay). |
| 29 | 8332 psi | A contiguous cylinder of concrete (base). |

The previous examples illustrated that even after 28 days, use of both a paste interface between the surface of a substrate and a hydrating cement-based material other than cement paste, such as new concrete, resulted in a bond overlay having an unexpected high compressive strength. The qualitative ranking of mix design bond effectiveness was similar to Example 11–19 even after 28 days. Whereas the exposure of the surface of a substrate to each of the following factors, (1) moisture, (2) carbon dioxide, (3) cement paste, and (4) microsilica, were key to increasing the compressive strength of the overlay bond, as shown in example 27. the combination of these factors resulted in a bond overlay having compressive strength which was superior to the concrete materials themselves, even after 28 days.

Example 30

The surface of a concrete road pavement is treated with high energy mixed paste followed by the application of new concrete similar to Example 3 except that instead of treating the surface with carbon dioxide, the surface is treated with a solution of calcium carbonate. The resulting compressive strength of the bond is similar to the compressive strength of the bond in Example 3. This hypothetical example is important to illustrate that the generation of carbonates at the surface of the concrete road pavement to increase the compressive strength of the bond can occur from many different sources other than from introducing carbon dioxide to a wet surface.

6. Summary

From the foregoing, it will be appreciated that the present invention provides novel compositions and processes for improving the bond between hydrating cement-based materials and the existing surfaces of cement-based substrates such that a new hydrating cement-based material may be placed onto or receive an existing surface of a cement-based substrate such that an integral bond is formed therebetween.

The present invention also provides novel compositions and processes for improving the bond between hydrating cement-based materials and the existing surfaces of cement-based substrates such that the strength and physical characteristics of the resulting cement composition are enhanced.

Moreover, the present invention provides novel compositions and processes for improving the bond between hydrating cement-based materials and the existing surfaces of cement-based substrates such that the new cement compositions may be used for repairing spall, cracks, chips, and such to surfaces such as driveways or road surfaces, or the construction of major concrete projects.

In addition, the present invention also provides novel compositions and processes for improving the bond between hydrating cement-based materials and the existing surfaces of cement-based substrates such that the cement compositions set at different times, which are set as a laminate, do not result in the formation of a cold joint therebetween.

Further, the present invention provides novel compositions and processes for improving the bond between hydrating cement-based materials and the existing surfaces of cement-based substrates such that the cement compositions set at different times, which are set side-by-side, do not result in the formation of a cold joint therebetween.

The present invention also provides novel compositions and processes for improving the bond between hydrating cement-based materials and the existing surfaces of cement-based substrates such that the bond experiences improved strength and may be subject to greater stresses and pressures than previously known in the art.

The present invention further provides novel compositions and processes for improving the bond between hydrating cement-based materials and the existing surfaces of cement-based substrates useful for construction, resurfacing, or repairing large construction projects such as interstate highways.

The present invention further provides novel compositions and processes for improving the bond between hydrating cement-based materials and the existing surfaces of cement-based substrates which modify the aqueous chemistry of the concrete substrate to be compatible or substantially similar to that of the hydrating cement.

The present invention further provides novel compositions and processes for improving the bond between hydrating cement-based materials and the existing surfaces of cement-based substrates which result in a bond that is amorphous, noncrystalline material.

The present invention further provides novel compositions and processes for improving the bond between hydrating cement-based materials and the existing surfaces of cement-based substrates which result in a bond that is characterized by low calcium hydroxide concentrations.

Yet further, the present invention provides novel compositions and processes for improving the bond between hydrating cement-based materials and the existing surfaces of cement-based substrates such that the new cement compositions possess high bonding strength to common substrates without the use of epoxies or other organic bonding agents.

Still further, the present invention provides novel compositions and processes for improving the bond between hydrating cement-based materials and the existing surfaces of cement-based substrates such that the new cement compositions do not require special curing compositions or techniques that would inhibit their use for common construction projects.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for bonding a hydrating cement-based material onto a surface of an existing cement-based substrate in order to form a mechanically integral bond interface therebetween, the method comprising the steps of:
   (a) moistening the surface of an existing cement-based substrate with water;
   (b) contacting the moistened surface of the cement-based substrate with carbon dioxide having a concentration greater than carbon dioxide found in atmospheric conditions;
   (c) mixing together hydraulic cement, water, and an aggregate material in a manner which yields a hydrating cement-based material in which the hydraulic cement, water, and aggregate material have been substantially homogeneously mixed;
   (d) applying the hydrating cement-based material onto the surface of the cement-based substrate; and
   (e) allowing the hydrating cement-based material to harden in order to form a mechanically integral bond interface between the hydrating cement-based material and the cement-based substrate.

2. A method for bonding a hydrating cement-based material onto a surface of an existing cement-based substrate as defined in claim 1, wherein the bond between the hydrating cement-based material and the surface of the cement-based substrate is obtained without an organic bonding agent.

3. A method for bonding a hydrating cement-based material onto a surface of an existing cement-based substrate as defined in claim 1, further comprising the step of applying at least one additional hydrating cement-based material over the hydrating cement-based material applied onto the surface of the cement-based substrate.

4. A method for bonding a hydrating cement-based material onto a surface of an existing cement-based substrate as defined in claim 3, wherein the hydrating cement-based material applied onto the surface of the cement-based substrate comprises a mixture of cement paste and silica fume.

5. A method for bonding a hydrating cement-based material onto a surface of an existing cement-based substrate as defined in claim 3, wherein the at least one additional hydrating cement-based material has been substantially homogeneously mixed.

6. A method for bonding a hydrating cement-based material onto a surface of an existing cement-based substrate as defined in claim 1, wherein the aggregate material comprises microsilica.

7. A method for bonding a hydrating cement-based material onto a surface of an existing cement-based substrate as defined in claim 1, wherein step (d) includes working the hydrating cement-based material into pores within the surface of the cement-based substrate after applying the hydrating cement-based material onto the cement-based substrate.

8. A method for bonding a hydrating cement-based material onto a surface of an existing cement-based substrate as defined in claim 1, wherein step (d) includes hand scrubbing the hydrating cement-based material into the surface of the cement-based substrate.

9. A method for bonding a hydrating cement-based material onto a surface an existing cement-based substrate as defined in claim 1, further comprising the step of cleaning the surface of the existing cement-based substrate prior to step (a) in order to remove noncementitious materials from pores within the surface of the existing cement-based substrate.

10. A method for bonding a hydrating cement-based material onto a surface of an existing cement-based substrate as defined in claim 1, wherein the aqueous phase chemistry of the surface of the existing cement-based substrate is in a supersaturated state with respect to calcium ions after steps (a) and (b).

11. A method for bonding a hydrating cement-based material onto a surface of an existing cement-based substrate as defined in claim 1, wherein the existing cement-based substrate comprises concrete which has begun to set.

12. A method for bonding a hydrating cement-based material onto a surface of an existing cement-based substrate as defined in claim 1, wherein the hydraulic cement in the hydrating cement-based material comprises silica aluminate cement.

13. A method for bonding a hydrating cement-based material onto a surface of an existing cement-based substrate as defined in claim 1, wherein the hydraulic cement in the hydrating cement-based material comprises a portland cement.

14. A method for bonding a hydrating cement-based material onto a surface of an existing cement-based substrate as defined in claim 1, wherein the hydraulic cement in the hydrating cement-based material comprises a mixture of chemically different hydraulic cements.

15. A method for bonding a hydrating cement-based material onto a surface of an existing cement-based substrate as defined in claim 1, wherein the hydraulic cement in the hydrating cement-based material comprises calcium aluminate cement.

16. A method for bonding a hydrating cement-based material onto a surface of an existing cement-based substrate as defined in claim 1, wherein the hydraulic cement in the hydrating cement-based material comprises dicalcium silicate cement.

17. A method for bonding a hydrating cement-based material onto a surface of an existing cement-based substrate as defined in claim 1, wherein the hydraulic cement in the hydrating cement-based material comprises tricalcium silicate cement.

18. A method for bonding a hydrating cement-based material onto a surface of an existing cement-based substrate as defined in claim 1, wherein the hydraulic cement in the hydrating cement-based material comprises phosphate cement.

19. A method for bonding a hydrating cement-based material onto a surface of an existing cement-based substrate as defined in claim 1, step (c) includes mixing carbon dioxide into the hydrating cement-based material.

20. A method for bonding a hydrating cement-based material onto a surface of an existing cement-based substrate as defined in claim 1, wherein the hydrating cement-based material has a ratio of water to hydraulic cement in a range from about 0.01 to about 5.

21. A method for bonding a hydrating cement-based material onto a surface of an existing cement-based substrate as defined in claim 1, wherein the aggregate material comprises a plurality of differently sized aggregate particles.

22. A method for bonding a hydrating cement-based material onto a surface of an existing cement-based substrate as defined in claim 1, wherein the aggregate material includes a plurality of fibers.

23. A method for bonding a hydrating cement-based material onto a surface of an existing cement-based substrate as defined in claim 22, wherein the fibers comprise glass fibers.

24. A method for bonding a hydrating cement-based material onto a surface of an existing cement-based substrate as defined in claim 22, wherein the fibers comprise alumina fibers.

25. A method for bonding a hydrating cement-based material onto a surface of an existing cement-based substrate as defined in claim 22, wherein the fibers comprise silica fibers.

26. A method for bonding a hydrating cement-based material onto a surface of an existing cement-based substrate as defined in claim 22, wherein the fibers comprise metallic fibers.

27. A method for bonding a hydrating cement-based material onto a surface of an existing cement-based substrate as defined in claim 22, wherein the fibers comprise organic fibers.

28. A method for bonding a hydrating cement-based material onto a surface of an existing cement-based substrate as defined in claim 1, wherein the surface of the cement-based substrate is exposed to the carbon dioxide for a time period sufficient to supersaturate the aqueous phase chemistry of the surface of the cement-based substrate with carbonate ions.

29. A method for bonding a hydrating cement-based material onto a surface of an existing cement-based substrate as defined in claim 1, wherein the mechanically integral bond interface that is formed between the hydrating cement-based material and the cement-based substrate is stronger than the tensile strength of the cement-based substrate.

30. A method for bonding a hydrating cement-based material onto a surface of an existing cement-based substrate in order to form a mechanically integral bond interface therebetween, the method comprising the steps of:
   (a) moistening the surface of the existing cement-based substrate with an aqueous carbonate solution:
   (b) mixing together hydraulic cement, water, and an aggregate material in a manner which yields a hydrating cement-based material in which the hydraulic cement, water, and aggregate material have been substantially homogeneously mixed;
   (c) applying the hydrating cement-based material onto the cement-based substrate; and
   (d) allowing the hydrating cement-based material to harden in order to form a mechanically integral bond interface between the hydrating cement-based material and the cement-based substrate.

31. A method for bonding a hydrating cement-based material onto a surface of an existing cement-based substrate as defined in claim 30, herein the aqueous carbonate solution includes a carbonated water solution.

32. A method for bonding a hydrating cement-based material onto a surface of an existing cement-based substrate as defined in claim 30, wherein the aqueous carbonate solution includes a carbonate or bicarbonate salt.

33. A method for bonding a hydrating cement-based material onto a surface of an existing cement-based substrate as defined in claim 30, wherein the bond interface between the hydrating cement-based material and the cement-based substrate is obtained without an organic bonding agent.

34. A method for bonding a hydrating cement-based material onto a surface of an existing cement-based substrate as defined in claim 30, further comprising the step of applying at least one additional hydrating cement-based material over of the hydrating cement-based material applied onto the surface of the cement-based substrate.

35. A method for bonding a hydrating cement-based material onto a surface of an existing cement-based substrate as defined in claim 34, wherein the hydrating cement-based material applied onto the surface of the cement-based substrate comprises a mixture of cement paste and silica fume.

36. A method for bonding a hydrating cement-based material onto a surface of an existing cement-based substrate as defined in claim 35, wherein the at least one additional hydrating cement-based material comprises concrete that has been substantially homogeneously mixed.

37. A method for bonding a hydrating cement-based material onto a surface of an existing cement-based substrate as defined in claim 30, wherein the aggregate material comprises microsilica.

38. A method for bonding a hydrating cement-based material onto a surface of an existing cement-based substrate as defined in claim 30, wherein step (c) includes working the hydrating cement-based material into the surface of the cement-based substrate.

39. A method for bonding a hydrating cement-based material onto a surface of an existing cement-based substrate as defined in claim 30, wherein step (c) includes hand scrubbing the hydrating cement-based material into the surface of the cement-based substrate.

40. A method for bonding a hydrating cement-based material onto a surface an existing cement-based substrate as defined in claim 30, further comprising the step of cleaning the surface of the existing cement-based substrate prior to step (a) in order to remove noncementitious materials from pores within the surface of the existing cement-based substrate.

41. A method for bonding a hydrating cement-based material onto a surface of an existing cement-based substrate as defined in claim 30, wherein the aqueous phase chemistry of the surface of the cement-based substrate is in a supersaturated state with respect to calcium ions after step (a).

42. A method for bonding a hydrating cement-based material onto a surface of an existing cement-based substrate as defined in claim 30, wherein the existing cement-based substrate comprises concrete which has begun to set.

43. A method for bonding a hydrating cement-based material onto a surface of an existing cement-based substrate as defined in claim 30, wherein the hydraulic cement in the hydrating cement-based material comprises silica aluminate cement.

44. A method for bonding a hydrating cement-based material onto a surface of an existing cement-based substrate as defined in claim 30, wherein the hydraulic cement in the hydrating cement-based material comprises a portland cement.

45. A method for bonding a hydrating cement-based material onto a surface of an existing cement-based substrate as defined in claim 30, wherein the hydraulic cement in the hydrating cement-based material comprises a mixture of chemically different hydraulic cements.

46. A method for bonding a hydrating cement-based material onto a surface of an existing cement-based substrate as defined in claim 30, wherein the hydraulic cement in the hydrating cement-based material comprises calcium aluminate cement.

47. A method for bonding a hydrating cement-based material onto a surface of an existing cement-based substrate as defined in claim 30, wherein the hydraulic cement in the hydrating cement-based material comprises dicalcium silicate cement.

48. A method for bonding a hydrating cement-based material onto a surface of an existing cement-based substrate as defined in claim 30, wherein the hydraulic cement in the hydrating cement-based material comprises tricalcium silicate cement.

49. A method for bonding a hydrating cement-based material onto a surface of an existing cement-based substrate as defined in claim 30, wherein the hydraulic cement in the hydrating cement-based material comprises phosphate cement.

50. A method for bonding a hydrating cement-based material onto a surface of an existing cement-based substrate as defined in claim 30, wherein step (b) includes mixing carbon dioxide into the hydrating cement-based material.

51. A method for bonding a hydrating cement-based material onto a surface of an existing cement-based substrate as defined in claim 30, wherein the hydrating cement-based material has a ratio of water to hydraulic cement in a range from about 0.01 to about 5.

52. A method for bonding a hydrating cement-based material onto a surface of an existing cement-based substrate as defined in claim 30, wherein the aggregate material comprises a plurality of differently sized and graded aggregates.

53. A method for bonding a hydrating cement-based material onto a surface of an existing cement-based substrate as defined in claim 30, wherein the aggregate includes a plurality of fibers.

54. A method for bonding a hydrating cement-based material onto a surface of an existing cement-based substrate as defined in claim 53, wherein the fibers include glass fibers.

55. A method for bonding a hydrating cement-based material onto a surface of an existing cement-based substrate as defined in claim 53, wherein the fibers include alumina fibers.

56. A method for bonding a hydrating cement-based material onto a surface of an existing cement-based substrate as defined in claim 53, wherein the fibers include silica fibers.

57. A method for bonding a hydrating cement-based material onto a surface of an existing cement-based substrate as defined in claim 53, wherein the fibers include metallic fibers.

58. A method for bonding a hydrating cement-based material onto a surface of an existing cement-based substrate as defined in claim 53, wherein the fibers include organic fibers.

59. A method for bonding a hydrating cement-based material onto a surface of an existing cement-based substrate as defined in claim 30, wherein the surface of the cement-based substrate is exposed to the aqueous carbonate solution for a time period sufficient to supersaturate the aqueous phase chemistry of the surface of the cement-based substrate with carbonate ions.

60. A method for bonding a hydrating cement-based material onto a surface of an existing cement-based substrate as defined in claim 30, wherein the mechanically integral bond interface that is formed between the hydrating cement-based material and the cement-based substrate is stronger than the tensile strength of the cement-based substrate.

* * * * *

UNITED STATES PATENT AND TRADEMARK OFFICE
CERTIFICATE OF CORRECTION

PATENT NO. : 5,505,987

DATED : April 9, 1996

INVENTOR(S) : Jennings et al.

Page 1 of 2

It is certified that error appears in the above-indentified patent and that said Letters Patent is hereby corrected as shown below:

<u>IN THE COVER PAGE</u>

In Item No. 63, entitled "Related U.S. Application Data" at line 4, delete "and Ser. No. 418,027,".

At Col. 1, starting at line 11, change "Kalzenberg" to --Kelzenberg--.

At Col. 1, line 18, change "Kalzenberg" to --Kelzenberg--.

At Col. 3, line 54, after "result" change "is" to --in--.

At Col. 5, line 30, after "materials" insert a period, and capitalize "such".

At Col. 6, line 64, after "can be" change "use" to --used--.

At Col. 7, line 50, after "epoxies" delete ",".

At Col. 13, line 6, change "therebetween" to --between--.

At Col. 13, line 59, after "dimension." delete ")".

At Col. 15, line 51, after "invention" delete ",".

At Col. 15, line 52, change "provide" to --provides--.

UNITED STATES PATENT AND TRADEMARK OFFICE
CERTIFICATE OF CORRECTION

PATENT NO. : 5,505,987
DATED : April 9, 1996
INVENTOR(S) : Jennings et al.

It is certified that error appears in the above-indentified patent and that said Letters Patent is hereby corrected as shown below:

At Col. 19, line 49, after "standards" delete ",".

At Col. 19, line 50, after "Moreover" insert --,--.

At Col. 19, line 63, before "hydrating" delete "use of".

At Col. 27, line 49, change "surthces" to --surfaces--.

At Col. 27, line 53, after "there" change "is" to --was--.

IN THE CLAIMS

At Col. 34, line 20, change "herein" to --wherein--.

Signed and Sealed this

Sixth Day of August, 1996

Attest:

BRUCE LEHMAN

Attesting Officer

Commissioner of Patents and Trademarks